(12) United States Patent
O'Neal et al.

(10) Patent No.: US 9,614,750 B2
(45) Date of Patent: *Apr. 4, 2017

(54) SYSTEM OF DISTRIBUTING CONTENT DATA OVER A COMPUTER NETWORK AND METHOD OF ARRANGING NODES FOR DISTRIBUTION OF DATA OVER A COMPUTER NETWORK

(71) Applicant: Network Foundation Technologies, LLC, Ruston, LA (US)

(72) Inventors: Mike O'Neal, Ruston, LA (US); Joel Francis, Coushatta, LA (US); Tara Johnson, Ruston, LA (US); Ben Stroud, Dubach, LA (US); Landon Wright, Ruston, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/546,794

(22) Filed: Nov. 18, 2014

(65) Prior Publication Data
US 2015/0295814 A1 Oct. 15, 2015

Related U.S. Application Data

(63) Continuation of application No. 13/356,423, filed on Jan. 23, 2012, now Pat. No. 8,892,770, which is a continuation of application No. 12/559,290, filed on Sep. 14, 2009, now Pat. No. 8,103,750.

(60) Provisional application No. 61/096,688, filed on Sep. 12, 2008.

(51) Int. Cl.
*G06F 15/16* (2006.01)
*H04L 12/729* (2013.01)
*H04L 12/18* (2006.01)
*H04L 29/06* (2006.01)
*H04L 12/751* (2013.01)
*H04L 12/761* (2013.01)
*H04L 12/753* (2013.01)
*H04L 29/08* (2006.01)

(52) U.S. Cl.
CPC ........ *H04L 45/125* (2013.01); *H04L 12/1854* (2013.01); *H04L 45/02* (2013.01); *H04L 45/16* (2013.01); *H04L 45/48* (2013.01); *H04L 65/4076* (2013.01); *H04L 67/10* (2013.01)

(58) Field of Classification Search
CPC . H04L 12/1854; H04L 65/4076; H04L 45/02; H04L 45/48; H04L 45/16
USPC ................ 709/220, 221, 226, 231
See application file for complete search history.

(56) References Cited

U.S. PATENT DOCUMENTS

| | | | |
|---|---|---|---|
| 5,781,906 A * | 7/1998 | Aggarwal et al. | |
| 2003/0051051 A1 * | 3/2003 | O'Neal et al. | 709/242 |
| 2005/0283523 A1 * | 12/2005 | Almeida et al. | 709/211 |

FOREIGN PATENT DOCUMENTS

WO    WO03069467    *   8/2003

* cited by examiner

*Primary Examiner* — David Lazaro
(74) *Attorney, Agent, or Firm* — Greenberg Traurig, LLP

(57) ABSTRACT

Described is a method for improving both the bandwidth efficiency and bit rate of data streams flowing through binary tree networks. In an embodiment, the invention provides a method for efficiently utilizing end-consumer computers possessing a variety of upstream bandwidth capabilities to deliver online streaming video in a distributed manner.

8 Claims, 21 Drawing Sheets

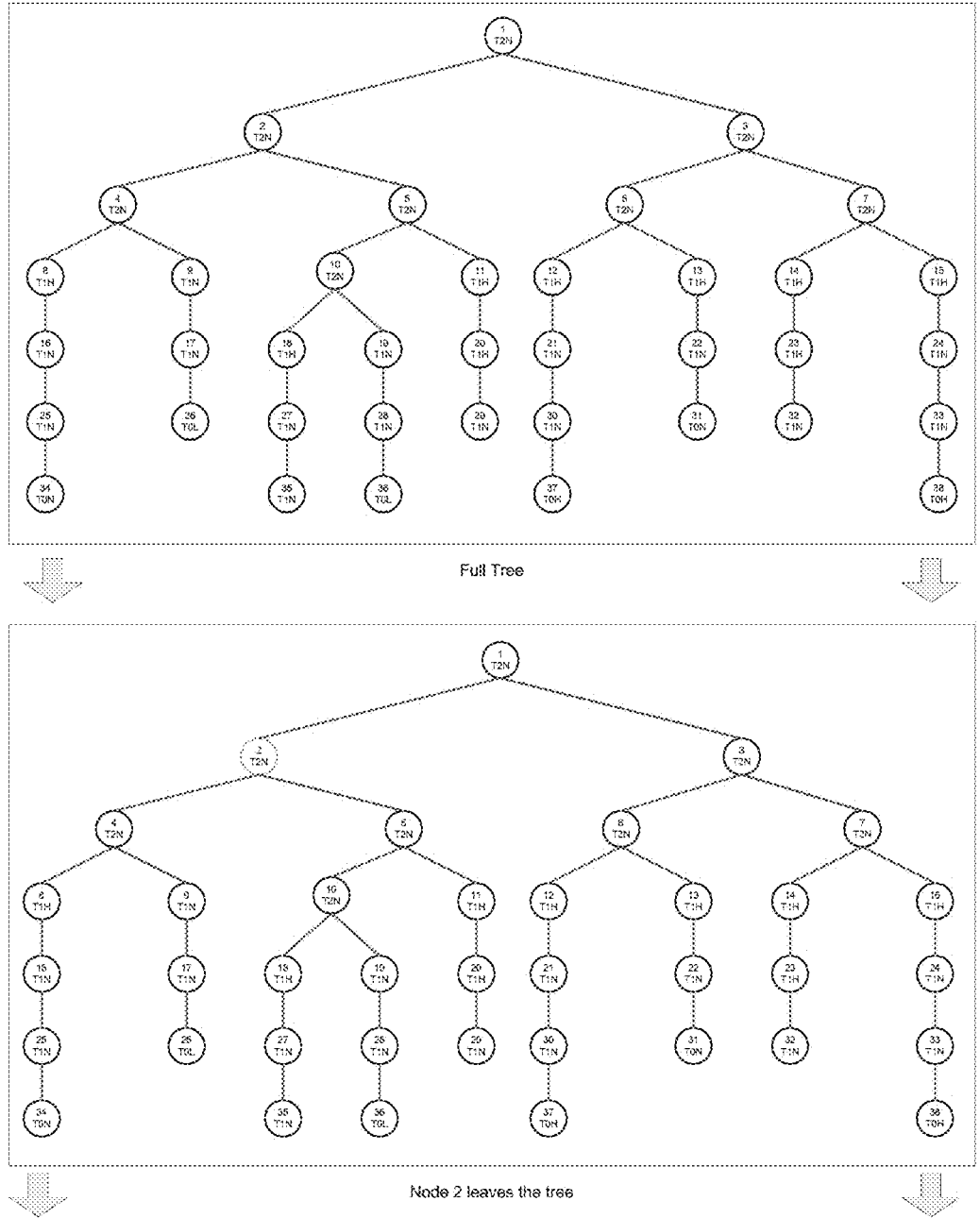
FIG. 30 (a) and (b)

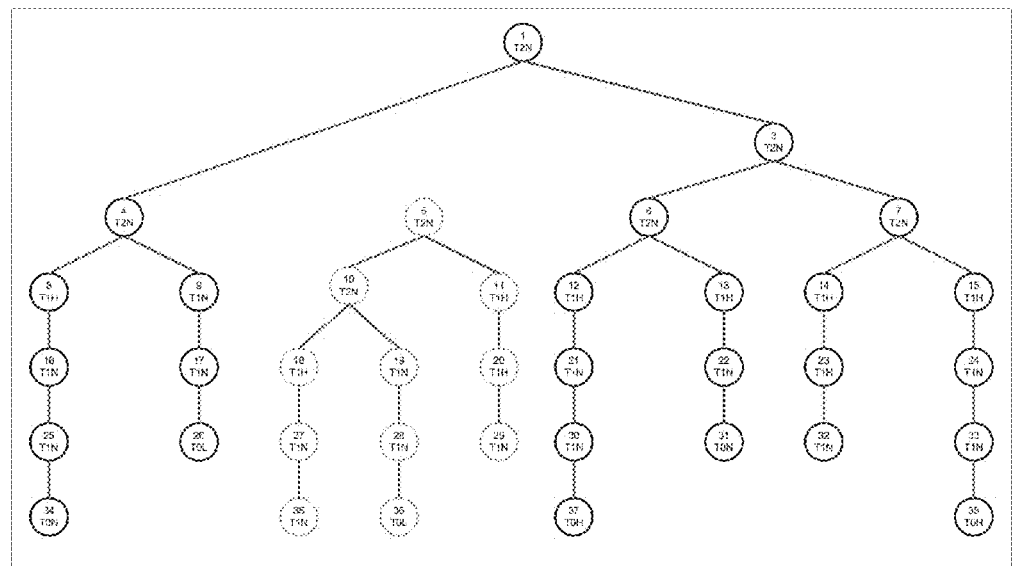
Node 4 is told to connect to Node 1 by the departing Node 2.
Node 5 is told to priority join to Node 4.
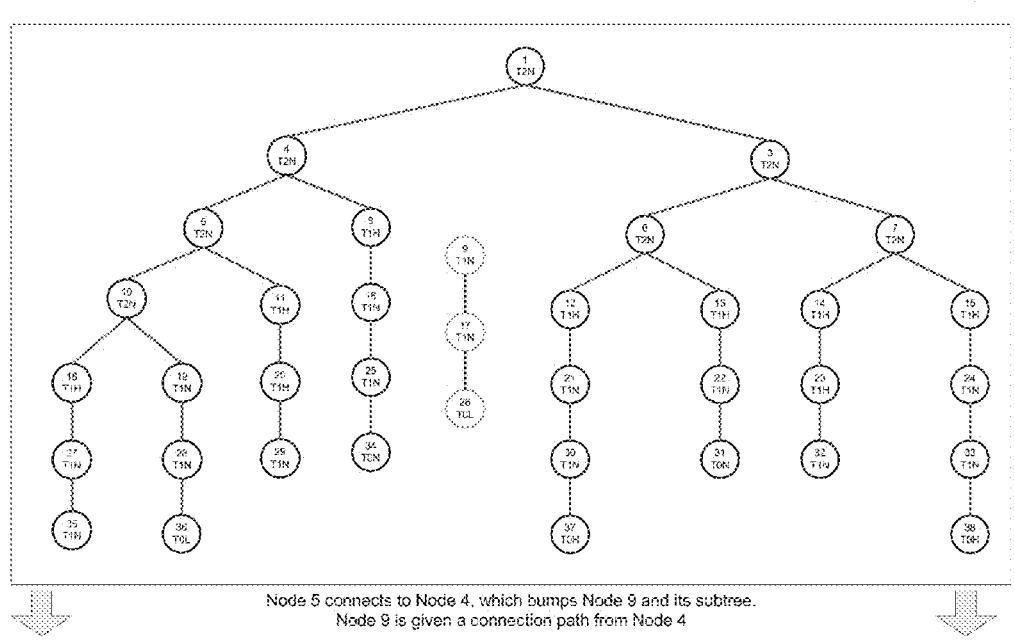
Node 5 connects to Node 4, which bumps Node 9 and its subtree.
Node 9 is given a connection path from Node 4
FIG. 30 (c) and (d)

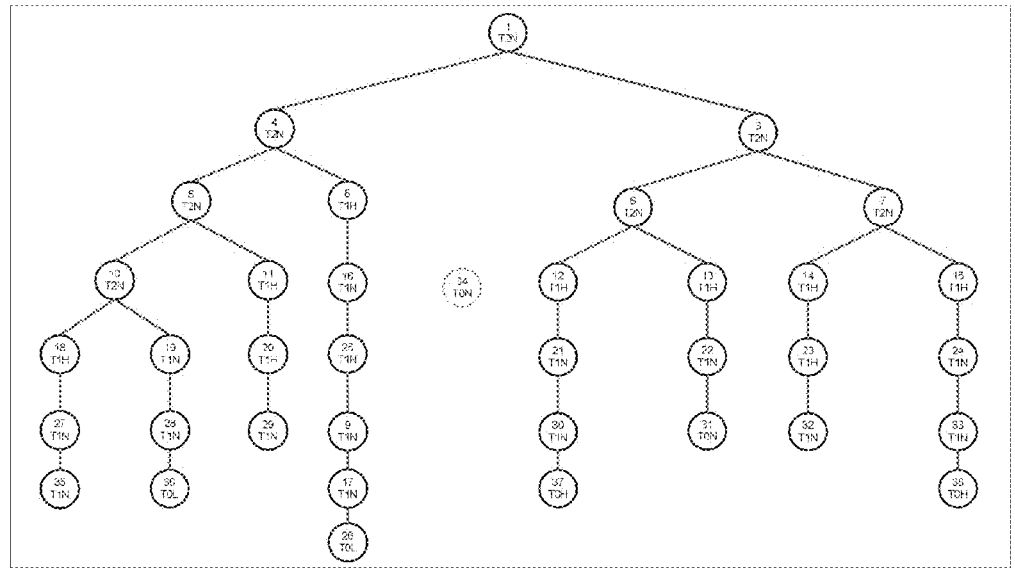
Node 9 connects to Node 25, which bumps Node 34
Node 25 tells Node 34 to go to Node 9 for its connection path.
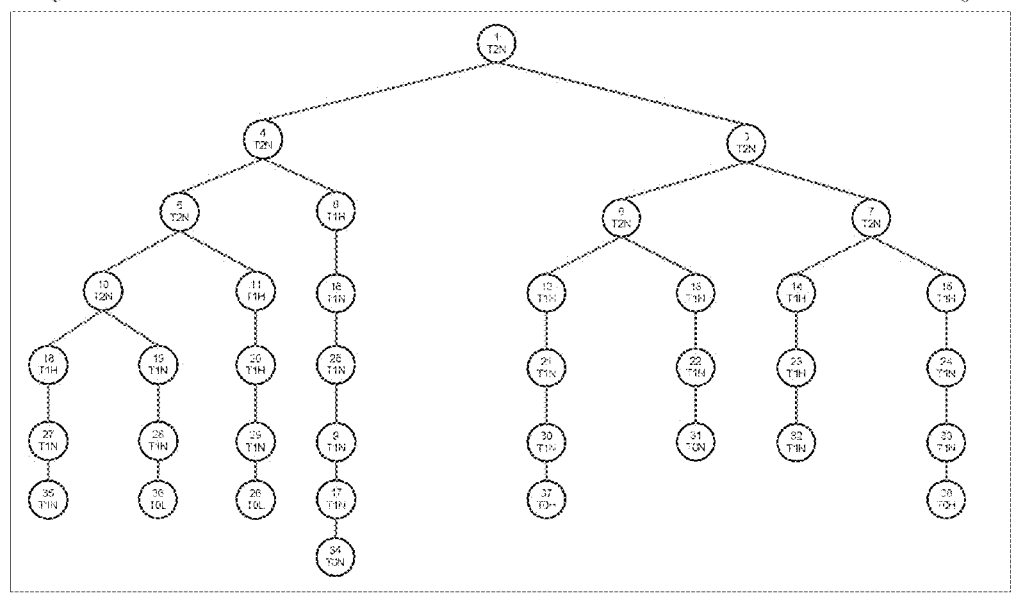
Node 34 connects to Node 17, which bumps Node 26.
Node 17 doesn't have a place for 26, so Node 26 climbs up its path until it finds a place to go.
Node 26 reaches Node 4 which connects Node 26 to Node 29.
FIG. 30 (e) and (f)

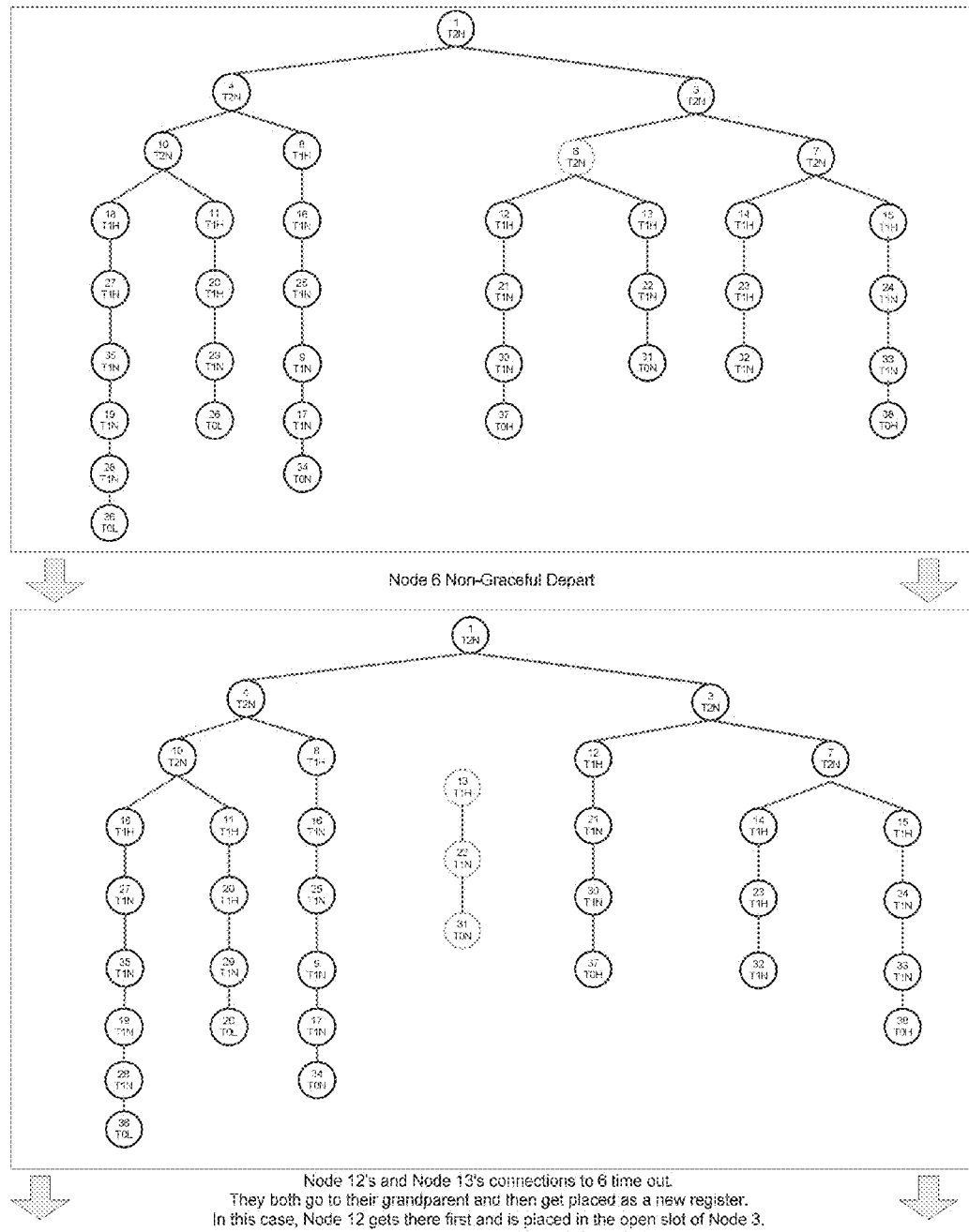
FIG. 31 (a) and (b)

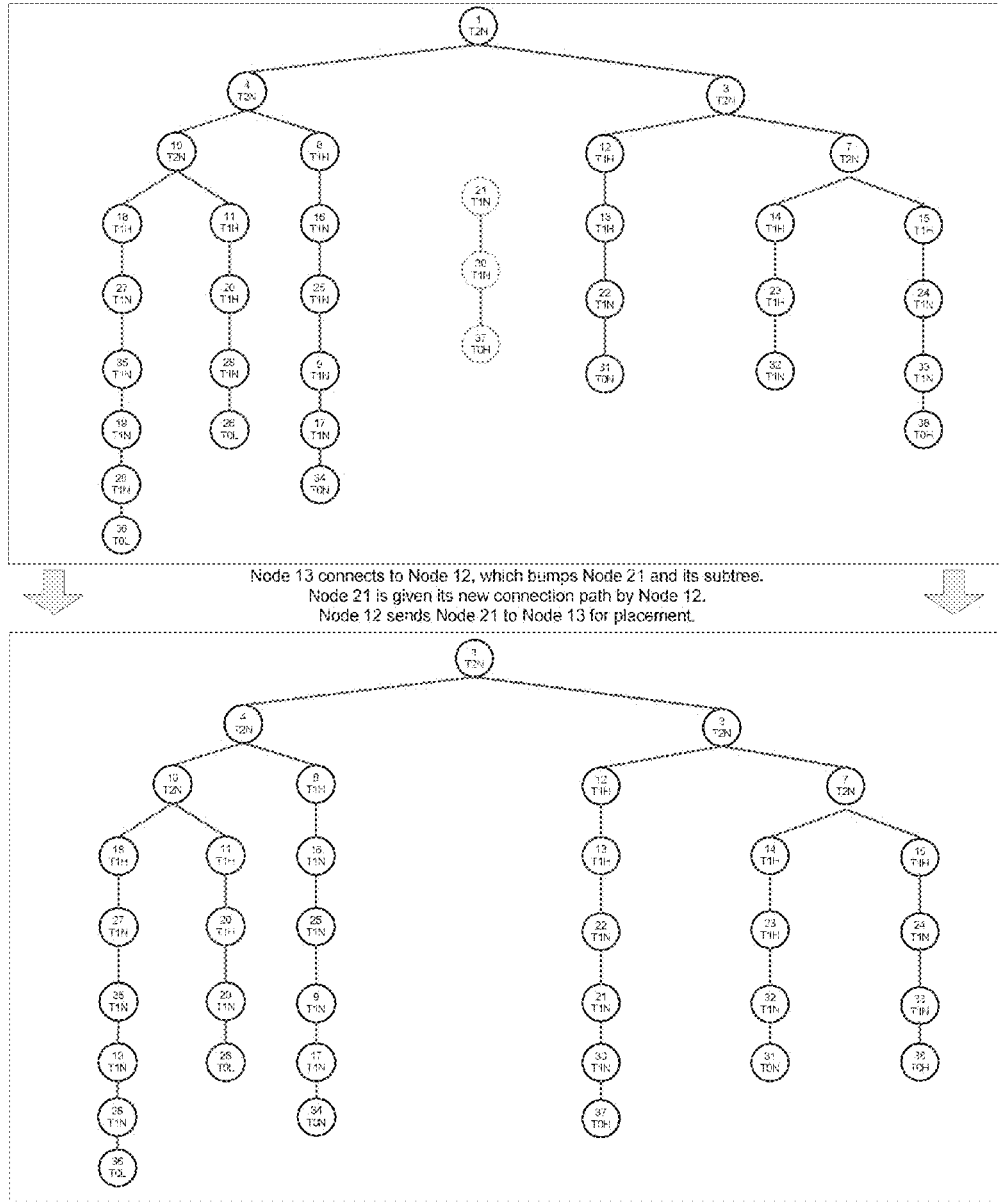
FIG. 31 (c) and (d)

SYSTEM OF DISTRIBUTING CONTENT DATA OVER A COMPUTER NETWORK AND METHOD OF ARRANGING NODES FOR DISTRIBUTION OF DATA OVER A COMPUTER NETWORK

This application is a continuation of U.S. patent application Ser. No. 13/356,423 filed Jan. 23, 2012, now U.S. Pat. No. 8,892,770, which is a continuation of U.S. Pat. No. 8,103,750, which claims priority to U.S. Provisional Patent Application No. 61/096,688 filed Sep. 12, 2008, the entire disclosures of which are incorporated by reference in their entirety. This application relates to the disclosure of U.S. Pat. No. 7,035,933 issued Apr. 25, 2006 entitled "System of Distributing Content Data over a Computer Network and Method of Arranging Nodes for Distribution of Data over a Computer Network," which is incorporated herein by reference in its entirety.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

This invention relates to a system for distributing content data over a computer network and a method for arranging nodes for distribution of data over a computer network. The system and method of the present invention are particularly useful for the distribution of streaming audio and video over the Internet.

BACKGROUND OF THE INVENTION

U.S. Pat. No. 7,035,933 describes a system and method that has proved useful for online distributed broadcasting of audio and video material. The disclosed system and method can reduce the amount of bandwidth consumed by video streaming servers by limiting the server's number of direct connections over the Internet to only a small number of end-consumer computers, and then utilizing a portion of the end-consumer computers that are tuned to the broadcast over the Internet as "repeater nodes" to help propagate the online broadcast to other viewers' computers. This approach to online broadcasting is in contrast to industry standard content delivery networks wherein each end-consumer's computer that is to receive an audio/video stream must establish a direct connection to a server. These servers are typically owned or operated on behalf of the broadcaster and thus the broadcaster is responsible for the bandwidth costs associated with each of these direct connections.

Various embodiments of the system and method disclosed in U.S. Pat. No. 7,035,933 display the following highly desirable traits:

The network architecture is based on a balanced binary tree and as such is tailored to deliver live broadcasts, not simply pre-recorded material as is the case with peer-to-peer networks, such as BitTorrent and the like.

The network architecture supports the addition of nodes (computers) as end-consumers tune in to the broadcast and the removal of nodes (computers) as end-consumers exit the broadcast. As a result, the invention does not need to run as a "background task" nor continuously tap into end-consumer's bandwidth as with peer-to-peer file sharing technologies. Instead the invention of U.S. Pat. No. 7,035,933 need only use an end-consumer's bandwidth while that end-consumer is tuned to a program.

The system and method disclosed in U.S. Pat. No. 7,035,933 does not store audio video content files on end-consumers' computers. This is in contrast to peer-to-peer file sharing systems which to work effectively must cache content throughout the network.

Because the system and method disclosed in U.S. Pat. No. 7,035,933 is based on a balanced binary tree, only one half of the nodes (end-consumer computers) in the network need act as repeater nodes in order for the system to achieve maximum bandwidth savings efficiency. This enables software applications incorporating this invention to be "polite" in the sense that whenever an end-consumer's computer is acting as a repeater node and that end-consumer needs to use his or her upstream bandwidth for other purposes (such as email, gaming, or Voice Over IP [VOIP] applications) that end-consumer's computer is moved to the edge of the network where it will no longer be expected to retransmit the broadcast. This reorganization of the network can take place without interrupting the end-consumer's viewing experience. The end result is a polite system that immediately relinquishes use of the end-consumer's upstream bandwidth the moment the end-consumer has need of that bandwidth for other purposes. In other words, the invention does not interfere with the end-consumers use of his or her Internet connection since the moment the end-consumer tries to send off a file (or otherwise use the upstream Internet connection) applications incorporating the invention relinquish control of the upstream Internet connection immediately. The bottom line is that end-consumer see no degradation in their Internet service when using applications based on the invention.

The system and method disclosed in U.S. Pat. No. 7,035,933 spreads the bandwidth needs of the system thinly throughout the network—never requiring an end-consumer computer to supply more than two copies of the video stream to other viewers. As a result the system avoids "super-noding" in which nodes (computers) with access to large amounts of bandwidth are expected to provide copies of the broadcast stream to large numbers of viewers. Not only is expecting certain computers to act as super nodes impolite, there are two very important reasons for avoiding it. First, if an application attempts to appropriate a large amount of bandwidth when running on corporate or university LANs the system administrators of those networks will take steps to block the application—which will result in potential viewers on corporate and university LANs from being able to run the application to watch video. The second reason to avoid designating certain computers as super nodes is that systems which depend on a small number of nodes to support a large percentage of the system's viewers are fragile in the sense that when a super node departs the system a large "hole" is created in the network that must somehow be "filled in" almost immediately or large numbers of viewers will experience signal degradation and loss of video stream.

The system and method of U.S. Pat. No. 7,035,933 delivers an exceptional Quality of Service. In addition to the characteristics described above, the reconfiguration algorithms covered by the patent use the turnover inherent in distributed networks (as viewers tune in and tune out) to promote the most reliable nodes to the most critical regions of the network, driving the network towards highly stable configurations which improve the quality of service delivered by the system.

The system and method of U.S. Pat. No. 7,035,933 also suffers from certain limitations, including the fact that the reconfiguration algorithms are described in detail only for binary trees in which all internal nodes must be capable of supporting two children nodes. This means that for a node (an end-consumer computer) to be used to repeat the broadcast stream to even a single additional computer, the node must have the upstream bandwidth capacity to support two additional computers. As a result, nodes (end-consumer computers) that only have access to Internet connections with upstream bandwidth capacity to send out a single copy of the broadcast stream are underutilized—they are never allowed to repeat the broadcast to anyone.

The practical consequences of these limitations are that for a given video streaming bit rate and a collection of nodes (end-consumer computers) possessing a variety of different upstream bandwidth capabilities, some nodes that could have been employed to rebroadcast the video stream will not be asked to do so, reducing the overall bandwidth efficiency that could have been otherwise achieved. Likewise for a given bandwidth efficiency target, a higher bit rate video stream could be supported, resulting in better picture quality and/or audio for the end-consumer.

Incorporating such a change into the system and method of U.S. Pat. No. 7,035,933 requires addressing the difficult problem of how to build and maintain a binary broadcast tree with repeat capable nodes of differing abilities. In order to create a useful and practical online broadcasting system, algorithms must be designed to build and maintain binary broadcast trees consistent with promoting the most reliable nodes to the most critical regions of the network (to promote stability) while maintaining overall tree balance (to limit propagation delays) and employing nodes that lack the ability to repeat to two children but possess the ability to repeat to a single child (to increase overall network efficiency).

SUMMARY OF THE INVENTION

In an embodiment, the invention provides a method for efficiently utilizing end-consumer computers possessing a variety of upstream bandwidth capabilities to deliver online streaming video in a distributed manner.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 30 (a-f) illustrates the reconfigurations that result from the graceful departure of a node;

FIG. 31 (a-d) illustrates the reconfigurations that result from the unexpected (non-graceful) departure of a node.

DETAILED DESCRIPTION OF THE PREFERRED EMBODIMENT

Figure 1:
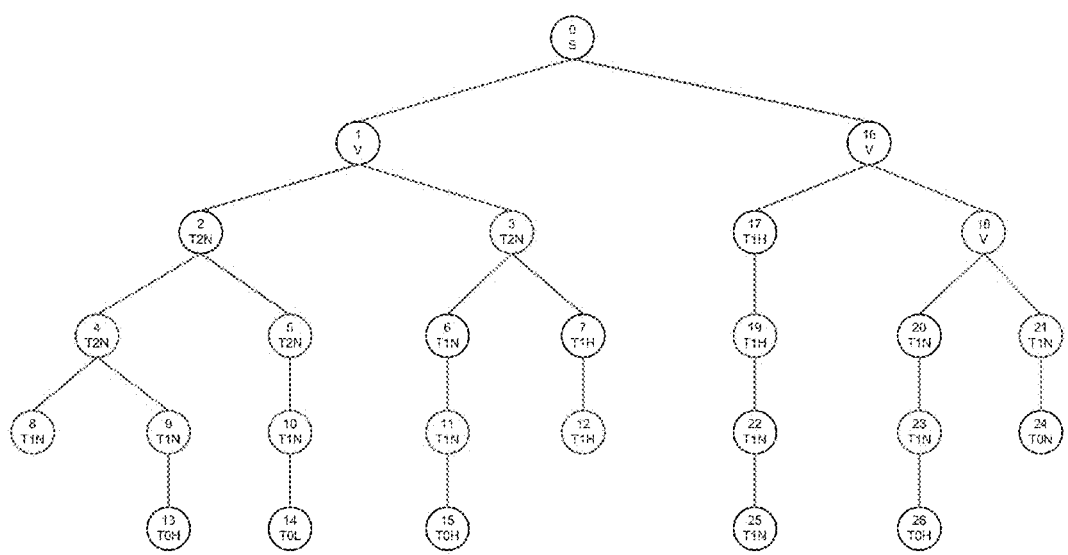
FIG. 1 is a schematic drawing of an embodiment of a computer information distribution network formed pursuant to an embodiment of the present system and method.

Reference will now be made in detail to the preferred embodiments of the present invention, examples of which are illustrated in the accompanying drawings.

The invention is described below with reference to block diagrams and operational illustrations of methods and devices for distributing content data over a computer network. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Node Types

In the system and method of U.S. Pat. No. 7,035,933 there were essentially two kinds of nodes: repeat capable nodes and non-repeat capable nodes. A node was deemed "repeat capable" if it possessed the upstream bandwidth capacity to support two outgoing audio/video streams plus some predefined additional capacity for overhead and margin. If a node did not have the capacity to support two children it was deemed non-repeat capable.

As pointed out above, this bifurcation of nodes was somewhat wasteful in that nodes fully capable of supporting a single child were not utilized by the system due to the inability of the reconfiguration algorithms to accommodate nodes capable of supporting only a single child.

In the present system and method there are three main types of nodes: Type 2 nodes, Type 1 nodes, and Type 0 nodes. As their names imply, Type 2 nodes are capable of supporting two children, Type 1 nodes are capable of supporting a single child, and Type 0 nodes are incapable of supporting any children.

In addition to these three major types, within a type various priorities may exist. The defined priorities are High, Normal, and Low. Each of these priorities does not necessarily exist for each of the types.

The type and priority of a node together define that node's preference level. The defined preference levels for nodes are as follows:

Type 2, Normal Priority (sometimes written as T2N) is the highest priority node known to the system. These nodes are capable of supporting two children and are roughly equivalent to "repeat capable" nodes in the previous system and method.

Type 1, High Priority (sometimes written as T1H) are capable of supporting a single child. At some point in their past T1H nodes were categorized as Type 2, but were later "demoted" to Type 1—generally as a result of poor performance when serving as the parent of two children. Type 1 High Priority are given preference over other Type 1 nodes in order to keep the Type 1 High Priority nodes as high in the tree as possible (just below the Type 2). This is due to the fact that we expect these nodes to be "stronger" than normal Type 1's and also so that if a Type 1 High Priority converts back to a Type 2 Normal node it will already be situated "near" the Type 2 nodes.

Type 1 Normal Priority is the third preference level of node that the system recognizes. Nodes whose upstream bandwidth tested capable of supporting one child but not two are given this rating when they join the network.

Type 0 High Priority is the fourth preference level of node that the system recognizes. These nodes are currently judged incapable of repeating to even a single child, however they were at one time Type 1. Type 0 High Priority are given preference over Type 0 Normal and Type 0 Low as they have a history of having been a productive node and therefore should be retained in the tree as much as possible in case they reconvert to Type 1 status again.

Type 0 Normal Priority is the fifth preference level of node that the system recognizes. The only type of node a Type 0 Normal can theoretically bump is a Type 0 Low priority. Type 0 Normal priority nodes correspond to the "non-repeat capable" nodes from the previous system and method. Nodes whose upstream bandwidth test too low to act as a repeater of even a single stream when the node joins the network are given this designation.

Type 0 Low Priority nodes are the sixth and lowest preference level of node recognized by the system. These nodes are incapable of bumping nodes of any type. A Type 0 node may be assigned "low priority" status for a number of reasons, such as an inability to reliably receive data from its parent node.

The fundamental rule concerning node type is that a node of a particular preference level may not bump a node at an equal or greater preference level, but may always bump a node at a lesser preference level. (The one exception to this rule is that Type 2 Normal nodes may cause other Type 2 Normal nodes to be bumped when executing priority and system joins, as explained below.)

Thus, except as stipulated in the previous paragraph, Type 2 Normal nodes may bump all nodes except other Type 2 Normal nodes. A Type 1 High Priority may not bump Type 2 Normal or other Type 1 High Priority nodes, but may bump Type 1 Normal Priority, Type 0 High Priority, Type 0 Normal Priority, and Type 0 Low priority. Likewise, Type 1 Normal Priority nodes cannot bump Type 2 Normal, Type 1 High, or other Type 1 Normal Priority nodes, but are free to bump all Type 0 nodes regardless of their "priority". Similarly, Type 0 High priority nodes cannot bump Type 2, Type 1, or other Type 0 High Priority nodes, but can bump Type 0 Normal and Type 0 Low priority nodes. Type 0 Normal can only bump Type 0 Low, and Type 0 Low can bump no one.
Introduction of Dynamic VTT and Definition of Primary and Secondary Sides of the Broadcast Tree FIG. 1 illustrates a complete distributed broadcast tree constructed according to the methods of the present system and method.

An innovation present in this system and method over that of U.S. Pat. No. 7,035,933 is the ability to form and maintain linear chains of nodes composed of nodes that are capable of broadcasting to only one child. These linear chains may be capped by nodes that are incapable of broadcasting to any nodes Another innovation present in this system and method is the demarcation of one side of the binary tree as "Primary" and the other side as "Secondary". The primary side of the tree, shown as the left, or green, side of the tree in FIG. 1, is where the system prefers to place nodes. The secondary side of the tree, shown as the right, or red, side of the tree in FIG. 1 is used to temporarily hold excess linear chains that cannot be accommodated in the Primary side of the tree.

A difference between the primary and secondary sides of the tree is that the capacity of the secondary side can be increased on an as-needed basis by the addition of VTT (Virtual Tree Top) nodes. VTT nodes are "virtual" nodes introduced into the binary tree to expand the "capacity" of the tree. VTT nodes map in the physical world to additional connections to the server. Hence, while a classical binary tree can only have two nodes connected directly to the root node/physical server, the use of VTT nodes allow for an arbitrary number of physical connections to the server. While VTT nodes have been described in previous applications related to U.S. Pat. No. 7,035,933, we extend their use to being generated dynamically based on the number and type of nodes present in a broadcast network. Previous applications related to U.S. Pat. No. 7,035,933 include U.S. patent application Ser. Nos. 11/176,956, 11/179,041, 11/179, 063, 11/408,169, and 11/746,494, which are incorporated herein by reference.

An important use of the Secondary side of the tree and use of dynamic VTT is to prevent individual linear chains from growing exceedingly long leading to an unbalanced tree.

As described elsewhere in this document, it is frequently desirable in the present system and method to merge linear chains of Type 1 nodes. If left unchecked, networks with few Type 2 nodes and many Type 1 nodes could devolve into a small number of very long chains. Long chains should be avoided as they lead to propagation delays. Additionally, large numbers of repeaters between an individual node (such as an edge node or node near the edge of the tree) and the server increase the likelihood of Quality of Service issues—since the "signal" is passing through a large number of "repeaters" each given to failure.

To limit the length of Type 1 chains in networks with few Type 2 repeaters, we define the concept of "long". Long, which may be a dynamic definition that is dependent on the total number of nodes, the total number of a particular type of node, the percentage of certain node types, ratios of the various node types, or other dynamic features of the network, is used to limit the total length of Type 1 chains. Whenever a merger of two linear chains is to be performed, if the length of the chain resulting from the merger were to exceed "long" the merge will not be performed and instead one of the linear chains would be moved to the Secondary side of the tree.

To prevent the secondary side of the tree from becoming saturated, additional VTT nodes are created as necessary to act as docking locations for additional linear Type 1 chains. However, a maximum saturation point may be defined which specifies the maximum number of VTT nodes allowable on the Secondary side of the tree.
The Basics of Reconfiguration Whenever a node with children leaves the broadcast network (or tree), the reconfiguration algorithms decide where to place the children of the departing node as well any node chains associated with those children.

There are two basic types of ways in which a node may leave the broadcast network (or tree): Graceful Departs, and Unexpected or Non-Graceful Departs.

The term "Graceful Depart" refers to a normal or procedural shutdown of the client application—the type of departure that is generated when the end-user clicks on the "x" in the upper right hand corner of the client interface in order to exit the application. When a graceful depart is initiated, all shutdown procedures are then completed. The departing node sends a depart message to its children and parent with instructions on how they are to proceed. The children of the departing node send out depart propagate packets to their children. These packets are updated at each level and propagated throughout the sub-trees.

The term "Unexpected or Non-Graceful Depart" refers to a node leaving the system in an unexpected manner—without the normal shutdown procedures being performed. A non-graceful depart can occur for any number of reasons: the computer that is running the client application may lose its Internet connection, or the machine running the client application may crash, or the end-user abnormally terminates the client application by "killing" it with Task Manager, etc. Generally, when an unexpected depart occurs, the children of the departing node will climb to their grandparent for instructions on how to proceed.

In addition to nodes leaving the network altogether by way of graceful and non-graceful departs, a node that remains in the network (tree) can change its position by disconnecting from its current parent and reconnecting to some other parent. These reconnections can be voluntary or involuntary in response to changing conditions in the network.

One type of reconfiguration event is a "Bump". The term "Bump" refers to a node being forcibly kicked by its parent so that the parent can accept a higher priority node in the bumped node's place. When the parent kicks the bumped node, it also tells the bumped node where to go next.

A "Priority Join" is a way to force reconfiguration. When a node registers with the priority join flag set, the node that it registers to kicks its red child and accepts the registering node as its new red child. Priority joins are only allowed for Type 2 nodes.

A "System Join" is a way to force a priority join in a non-graceful reconfiguration. A system join is triggered when a Type 2 node with children registers with a node that cannot accept it as a child. During a system join, the joining node is told to priority join to the red child of the node with which it is trying to register.

Two additional terms that are frequently used when discussing reconfiguration are: the "Recommended Parent List" and the "Network Topology Model" or NTM.

A node's Recommended Parent list is a list of all nodes known to that node that can act as parent nodes. The Recommended Parent list will vary from node to node as an individual node can only recommend parents that are within its own sub-tree. The Recommended Parent list is usually sorted (or organized in some way) so as to make finding the "best" recommended parent easy to accomplish. The "best" recommended parent will generally be the recommended parent that is closest to the server (the root of the broadcast tree).

The Network Topology Model (or NTM) is a node's internal model of the structure of the portion of the network of which the node is aware. A node's NTM generally consists of a path from the root/server node down to the node in question, together with the sub-tree of the overall network tree that is rooted at the node. Network Topology Models are generally annotated with state information about the nodes contained in the model, such as the recommended parent lists of all nodes in the sub-tree. A node uses its NTM to determine where to place incoming nodes that attempt to connect to the node in question.

Merging Chains of Type 1 Nodes

Merging is the process of combining two chains of Type 1 Nodes where each chain may or may not be capped with a Type 0 node. When a node directly supporting two node chains departs the network, either gracefully or non-gracefully, its two chains may be merged as long as their combined length does not exceed the pre-defined value for "long".

Figure 2:
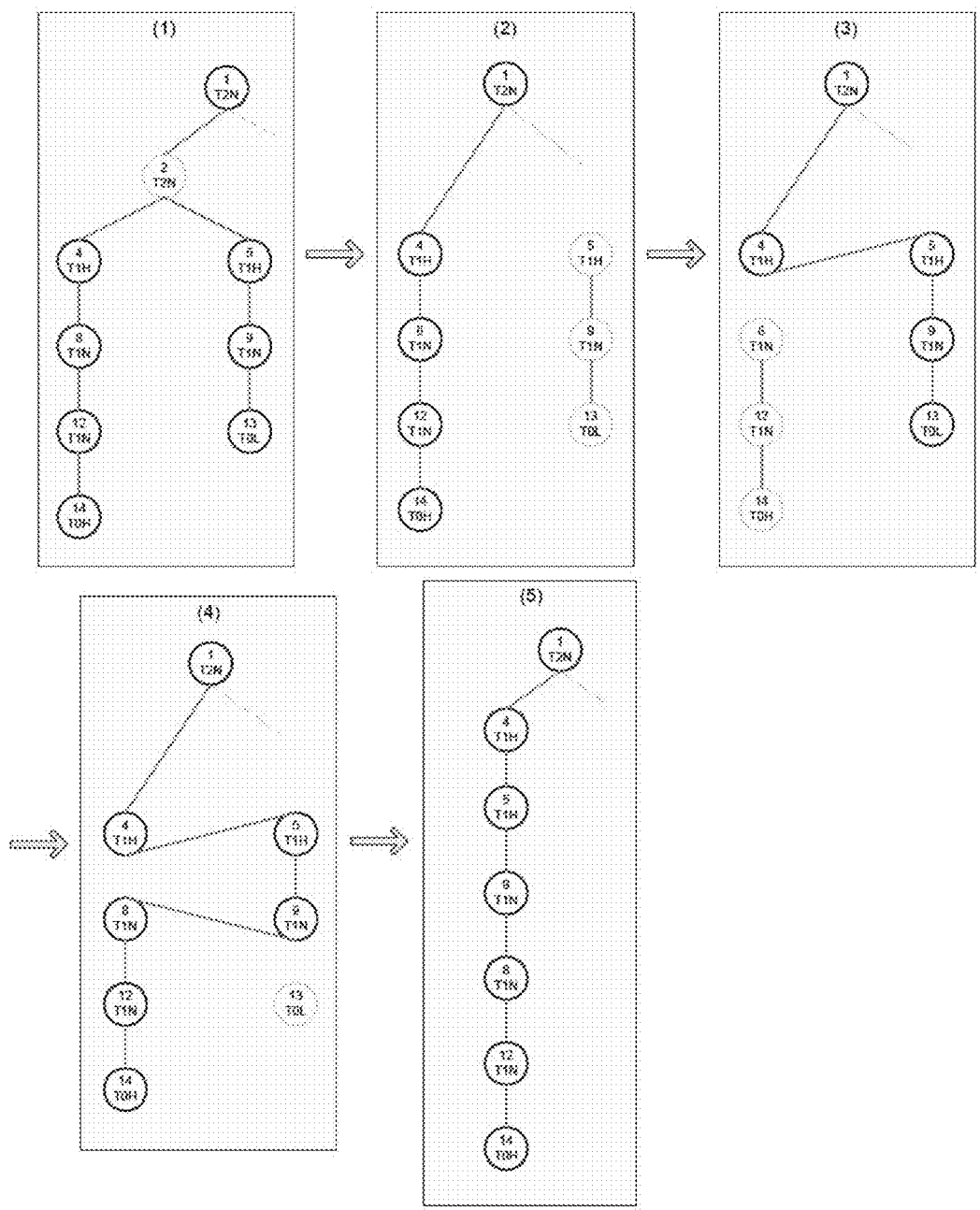
FIG. 2 is an illustration of the method used to merge two linear chains of nodes upon the departure of a Type 2 node.

FIG. 2 illustrates the node chain merger process. Initially Node 2 is the parent of two Type 1 nodes, Node 4, a Type 1 High Priority, is the green child of the departing node and Node 5, also a Type 1 High Priority, is the red child of the departing node. Node 4 is the root of a chain of Type 1 nodes (Node 4, Node 8, and Node 12) capped by a Type 0 node, Node 14. Similarly, Node 5 is the root of a Type 1 chain (Node 5 and Node 9) capped by a Type 0 node, Node 13.

1) Node 2 leaves the tree. It sends out the depart packet with reconfiguration instruction.
2) Node 4 connects to Node 1.
3) Node 5 connects to Node 4 and bumps Node 8. Node 4 tells Node 8 to go to Node 5 where 4 kicks 8.
4) Node 8 connects to Node 5 and 5 tells 8 to go to Node 9 and bump Node 13. Node 9 tells Node 13 to connect to 8.
5) Node 8 tells Node 13 that 8 cannot place 13 so 13 climbs to the first 2 in 13s path and continues to the server until 13 is placed. The two chains are now completely merged.

Node 2 departs the network leaving behind the two node chains. As Node 4 is the green child of the departing node it will be instructed to connect to its former grandparent, Node 1. Node 5 will be instructed to connect into the chain rooted by Node 4 immediately below the lowest Type 1 High Priority node. Since there is only one Type 1 High Priority node in the chain rooted at Node 4, Node 5 will connect to that node, which happens to be Node 4.

In order to accept Node 5, Node 4 was forced to bump its Type 1 Normal child, node 8. During the bump of Node 8 by Node 4, Node 4 will have instructed Node 8 to connect to Node 5 for further instructions. Since Node 8 is Type 1 Normal it cannot become a child of Node 5, instead Node 5 instructs Node 8 to connect as a child of Node 9. Node 8 connects to Node 9, causing Node 13 a Type 0 Low Priority node to be bumped.

Node 13 then attempts to connect to Node 8, but since Node 13 is Type 0 Low which is incapable of bumping anyone and the chain headed by Node 8 terminates in a Type 0 High (Node 14), Node 13 is rejected and must climb its path, beginning at the first Type 2 node and working upwards towards the root server until it can either be placed or rejected completely from this broadcast tree.

Thus the two linear chains have now been completely merged into a single chain, with the level of nodes respected—Type 1 High Priority nodes situated above Type 1 Normal Priority Nodes and Type 0 High Priority retained in preference to Type 0 Normal or Low priority.

Handling Graceful Node Departures

Whenever a departing node completes its shutdown procedure, it sends a depart message to its children and parent. The green child of the departing node is instructed to connect to the parent of the departing node. If there is a red child, a decision has to be made as to what to do with this red child based upon the type of the red child. If the red child is a Type 2, the departing node may tell the red child to priority join to its sibling. If the child is a Type 1 or a Type 0, then the departing node sends the red child a connection path based on the recommended parent list of its green sibling. If there is no place for the Type 1 or Type 0 red child to be placed in the green child's sub-tree, then the departing node will tell the Type 1 or Type 0 red child to climb its path.

FIG. 3 through FIG. 10 illustrate the expected reconfiguration behavior resulting from nodes departing the network in a graceful manner.

Figure 3:
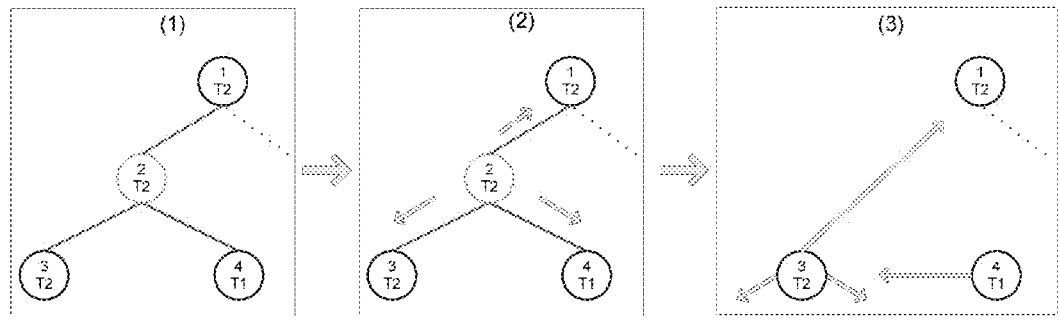
FIG. 3 is an illustration of the general method used to reconfigure the network in the case of the graceful departure of a Type 2 node.

In FIG. 3, the end-user whose client application is identified as Node 2 clicks the "X" in the upper right hand corner of the client or otherwise instructs the application to exit. As part of its close out procedure, Node 2 constructs depart messages which contain information instructing the nodes surrounding Node 2 what actions they are to take. Node 3 receives a message from Node 2 instructing it to connect to its former grandparent, Node 1. Node 1 receives a message from Node 2 instructing it to expect Node 3 to connect to it as a replacement for Node 2. Node 4 receives a message from Node 2 containing instructions as to where it should connect as described above. Depending on the type and number of children Node 3 already supports as well as the type of Node 4, Node 4 may connect directly as a child of Node 3, somewhere in the sub-tree rooted at Node 3, elsewhere in the network, or even under rare circumstances be rejected completely if there is no available location to which it can dock.

1. User clicks X or file/close on Node 2. Node 2 constructs the depart packet which contains information telling each node what actions to take. It will tell Node 3 to connect to its (node 2's) parent which is Node 1. It will tell Node 4 where to go based on the recommended parent list for Node 3. It constructs a path for Node 4 and places it in the depart packet. This path would [Node 3, Node 1, . . . ].

2. Node 2 sends the depart packet to its children and its parent. This packet tells its recipients the id of the parent, green child, red child of the departing node. Each node then compares its id with the id's of the parent, green child and red child to determine its relationship with the departing node. Each node then takes the action corresponding to its relationship with the departing node.

3. Node 3 constructs and sends the depart propagate packet to its children. This packet is propagated to Node 3's subtree. The depart propagate packet is altered at each level and customized for the particular node's children. In other words, upon receipt of the depart propagate packet, each node modifies the packet based on what its children should do and sends it if it deems sending is necessary. The purpose of the depart propagate packet is to reconfigure the subtree of the departing node. Each T2 child of the departing node may construct and send a depart propagate packet based on its subtree.

Figure 4:
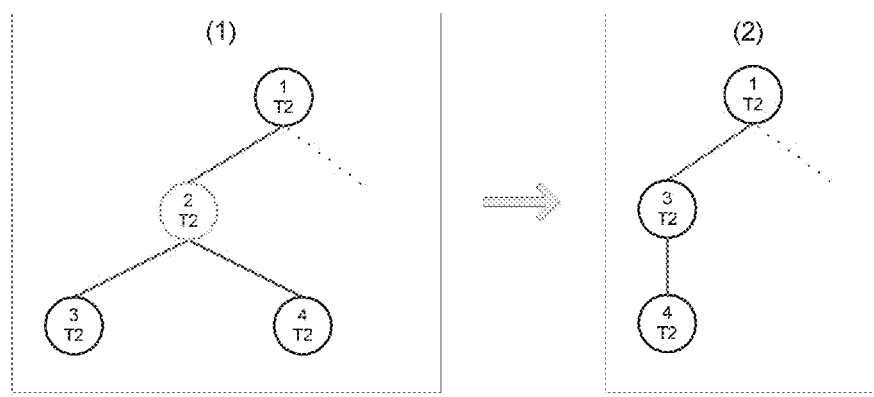
FIG. 4 is an illustration of the general method used to reconfigure the network in the case of the graceful departure of a Type 2 node with two Type 2 children.

FIG. 4 illustrates the case in which both children (Node 3 and Node 4) of the departing node, Node 2, are Type 2. In this case Node 3 is instructed to connect to Node 1 and Node 4 is instructed to connect to Node 3. This type of reconfiguration is similar to standard reconfiguration in the U.S. Pat. No. 7,035,933.

1. Node 2 gracefully departs. Node 2 sends the depart packet to its parent and its children. Node 3 is told to climb to Node 1 and Node 4 is told to cross connect to Node 3.

2. Node 3 climbs to Node 1 and Node 4 cross connects to Node 3.

Figure 5:
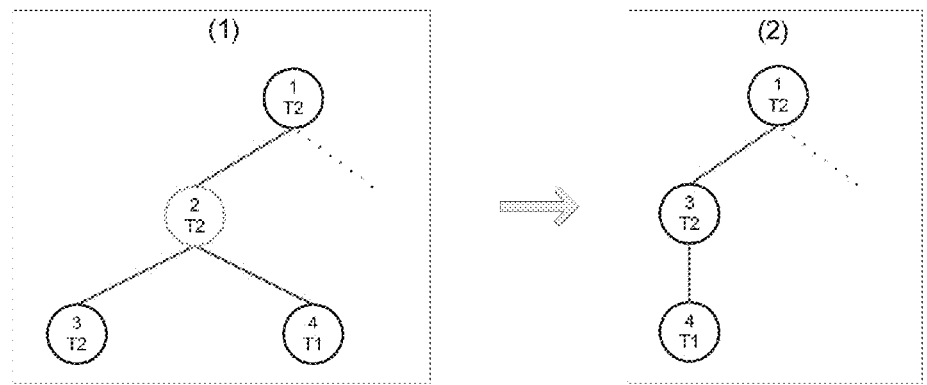
FIG. 5 is an illustration of the general method used to reconfigure the network in the case of the graceful departure of a Type 2 node with one Type 2 child and one Type 1 Child, where the Type 2 Child is the preferred (green) child.

FIG. 5 illustrates the case in which the preferred (green) child (Node 3) of the departing node is Type 2, while the non-preferred (red) child (Node 4) of the departing node is Type 1. In this case, Node 3 will connect to its former grandparent Node 1, while Node 4 will be instructed to connect to a node in Node 3's sub-tree based on Node 3's recommended parent list.

1. Node 2 gracefully departs. Node 2 sends the depart packet to its parent and its children. Node 3 is told to climb to Node 1 and Node 4 is placed by Node 2 in Node 3's subtree based on Node 3's recommended parent list.

2. Node 3 climbs to Node 1 and Node 4 connects to its recommended parent which is 3 in this case.

Figure 6:
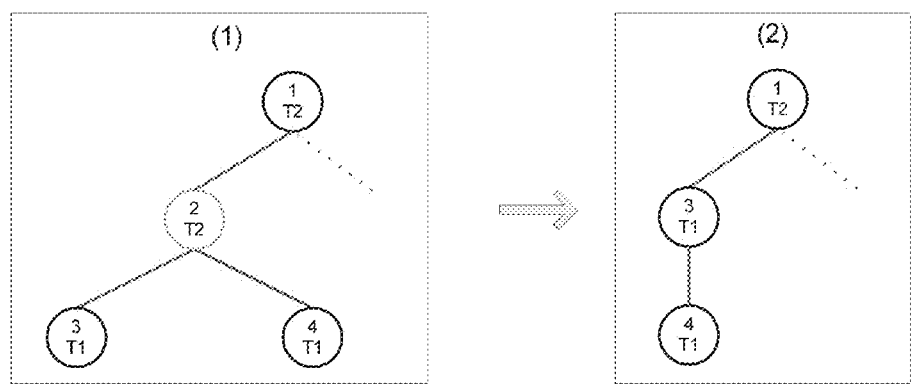
FIG. 6 is an illustration of the general method used to reconfigure the network in the case of the graceful departure of a Type 2 node with two Type 1 children.

FIG. 6 illustrates the case in which both children of the departing node are Type 1 nodes. In this case, Node 3 will connect to Node 1 and Node 4 will be instructed to connect to a node in Node 3's sub-tree based on Node 3's recommended parent list. Note that if Node 3 and Node 4 were the heads of linear chains, a chain merger would occur using the method illustrated in FIG. 2 and described above.

1. Node 2 gracefully departs. Node 2 sends the depart packet to its parent and its children. Node 3 is told to climb to Node 1 and Node 4 is placed by Node 2 in Node 3's subtree based on Node 3's recommended parent list.

2. Node 3 climbs to Node 1 and Node 4 connects to its recommended parent which is 3 in this case. Note that if 4 and 3 were dragging chains, a chain reconfiguration would occur such as is described in FIG. 2.

Figure 7:
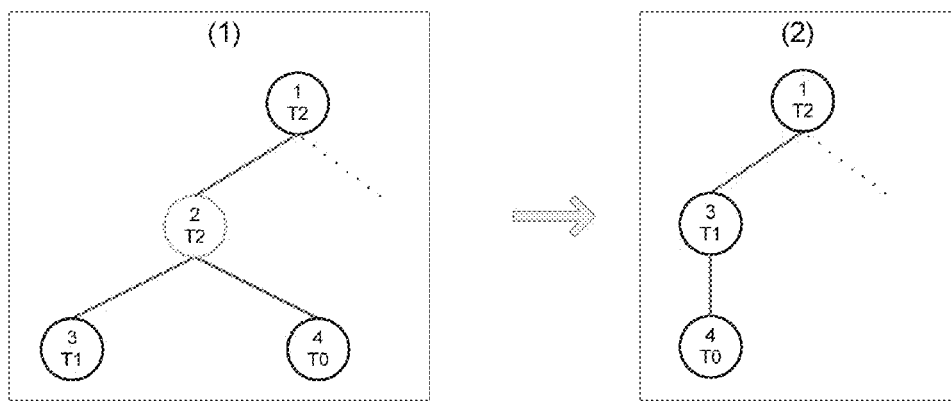
FIG. 7 is an illustration of the general method used to reconfigure the network in the case of the graceful departure of a Type 2 node with one Type 1 child and one Type 0 Child, where the Type 1 Child is the preferred (green) child.

FIG. 7 illustrates the case in which Node 3, the green child of departing Node 2 is Type 1 while the red child of the departing node (Node 4) is Type 0. Node 3 is instructed to connect to Node 1 and Node 4 will be instructed to connect to a node in Node 3's sub-tree based on Node 3's recommended parent list.

1. Node 2 gracefully departs. Node 2 sends the depart packet to its parent and its children. Node 3 is told to climb to Node 1 and Node 4 is placed by Node 2 in Node 3's subtree based on Node 3's recommended parent list.

2. Node 3 climbs to Node 1 and Node 4 connects to its recommended parent which is 3 in this case.

Figure 8:
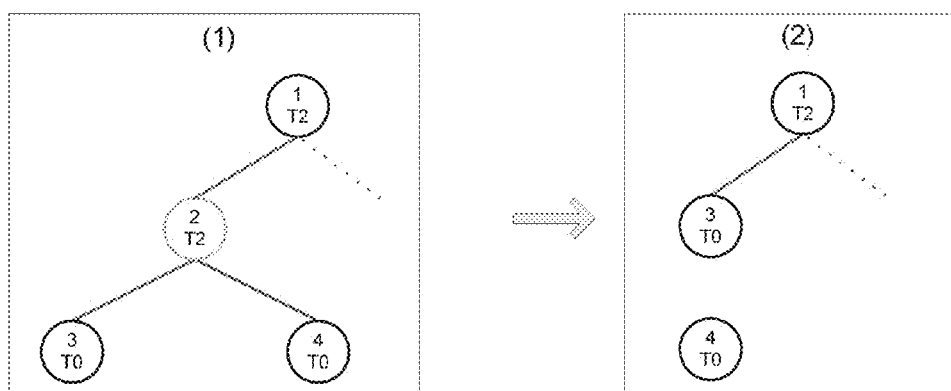
FIG. 8 is an illustration of the general method used to reconfigure the network in the case of the graceful departure of a Type 2 node with two Type 0 children.

FIG. 8 illustrates the case in which both children of departing Node 2 are of Type 0. The green child, Node 3, is instructed to connect to Node 1. However the red child, Node 4, must climb its path looking for a home. It first connects to Node 1 and if Node 1 cannot place it, will climb to higher levels of the tree until it reaches the server. If the server cannot place Node 4 it will be rejected from the broadcast tree.

1. Node 2 gracefully departs. Node 2 sends the depart packet to its parent and its children. Node 3 is told to climb to Node 1 and Node 4 is told to climb its path.

2. Node 3 climbs to Node 1 and Node 4 climbs its path.

Figure 9:
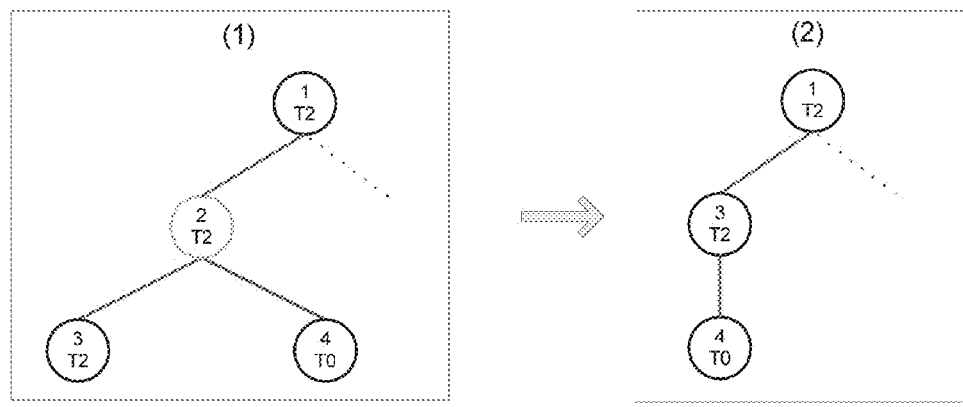
FIG. 9 is an illustration of the general method used to reconfigure the network in the case of the graceful departure of a Type 2 node with one Type 2 child and one Type 0 Child, where the Type 2 Child is the preferred (green) child.

FIG. 9 illustrates the case where Node 3, the green child of departing Node 2, is of Type 2; while Node 4, the red child of the departing node, is of Type 0. In this case, Node 3 will be instructed by Node 2's depart message to connect to Node 1. Node 1 will expect Node 3 based on its own message from Node 2. Node 4 will be directed to connect to a location in Node 3's sub-tree (assuming a location is available for a Type 0 to dock) based on Node 3's recommended parent list.

1. Node 2 gracefully departs. Node 2 sends the depart packet to its parent and its children. Node 3 is told to climb to Node 1 and Node 4 is placed by Node 2 in Node 3's subtree based on Node 3's recommended parent list.

2. Node 3 climbs to Node 1 and Node 4 connects to its new parent which is 3 in this case.

Figure 10:
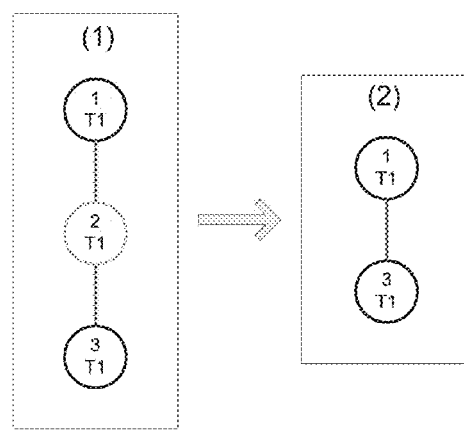
FIG. 10 is an illustration of the general method used to reconfigure the network in the case of the graceful departure of a Type 1 node where that Type 1 node has a child.

FIG. 10 illustrates a graceful depart of a Type 1 node. Node 2, a Type 1 node, executes a graceful client shutdown. As a result Node 2 transmits depart messages to its parent, Node 1, and its child, Node 3. Node 2's depart message instructs Node 3 to connect to its former grandparent, Node 1.

1. Node 2 is shutdown gracefully. Node 2 sends out the depart packets.

2. Node 3 connects to Node 2's old parent which is his grandparent, Node 1.

Handling Unexpected (Non-Graceful) Node Departures

When an unexpected or non-graceful depart occurs, such as happens when a node loses its connection to its parent, the children of the departing node will climb their path to their former grandparent for placement. The first child that registers with its former grandparent is accepted. The second child that registers with its grandparent will take different actions based on its type. If the slower child is a Type 2 and has children, that node will do a system join to its grandparent. The grandparent will instruct the joining node to priority join to the grandparent's red child. Otherwise, the second child will follow the normal registration procedure. If the second child is a Type 1 or Type 0, the grandparent places it as if it were just entering the network. The node may not priority join, as priority join functionality is reserved only for Type 2 nodes. Type 1 and Type 0 nodes must register normally at all times. The reason behind this restriction is to prevent Type 1 nodes from bumping Type 2 nodes or higher priority Type 1 nodes. Since nodes that priority join are automatically accepted as a node's red child and that red child is bumped, Type 1 nodes could bump Type 2 nodes if they were allowed to priority join. Since this would work counter to the notion of placing higher level nodes closer to the server, only Type 2 nodes are allowed to priority join.

FIG. 11 through FIG. 18 illustrate the reconfiguration behaviors resulting from nodes departing the network in an unexpected (non-graceful) manner.

Figure 11:
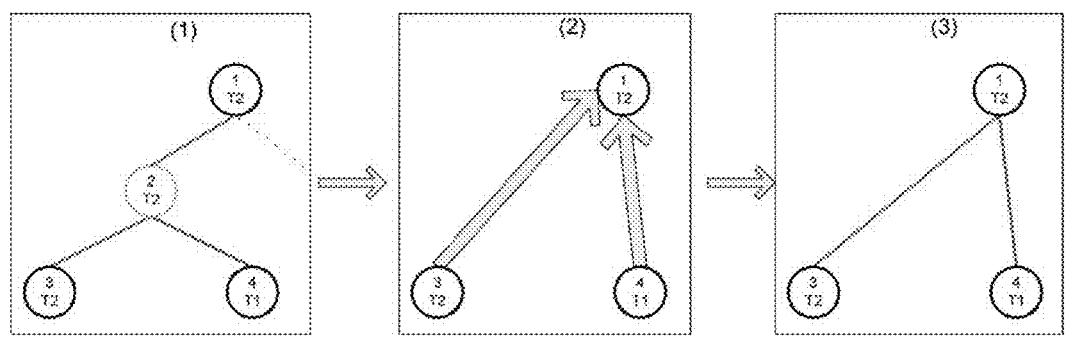
FIG. 11 is an illustration of the general method used to reconfigure the network in the case of the unexpected (non-graceful) departure of a Type 2 node.

FIG. 11 illustrates the general method for handling unexpected or non-graceful node departures. Node 2, the parent of two nodes, Node 3 and Node 4, and the child of Node 1, departs the network in an unexpected and non-graceful manner. Since no depart messages were generated and sent by Node 2 prior to its departure, Node 3 and Node 4 simply lose their connections to Node 2. As each of these nodes become aware that Node 2 no longer exists in the network, via connection time outs or some other means, they will climb to their former grandparent, Node 1. The node that reaches Node 1 first will be connected to Node 1 as its child, replacing the departed Node 2. The slower of the two nodes will be dealt with as described above.

1. Node 2 is shutdown non-gracefully (e.g. client loses internet).
2. Nodes 3 and 4 lose connection Node 2. Thus, they climb their path to Node 1.
3. Node 1 places them in the order in which they arrive. Image (3) shows one possible outcome.

Figure 12:
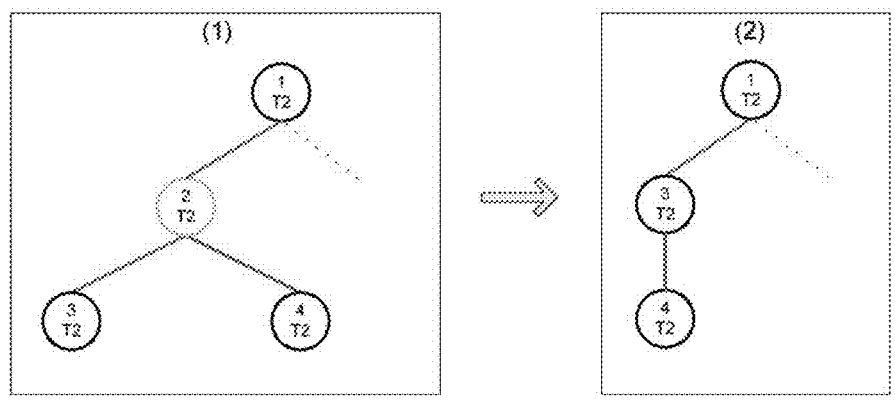
FIG. 12 is an illustration of the general method used to reconfigure the network in the case of the unexpected (non-graceful) departure of a Type 2 node with two Type 2 children.

FIG. 12 illustrates the case where both children of the unexpectedly departing node are Type 2.
1. Node 2 non-gracefully departs. Node 3 and Node 4 detect that their parent has departed. Both climb their path to their grandparent (Node 1).
2. Node 1 places Nodes 3 and 4 based on its recommended parent list. They will end up in different places depending on who registers with Node 1 first. Image (2) shows one possible scenario.

Figure 13:
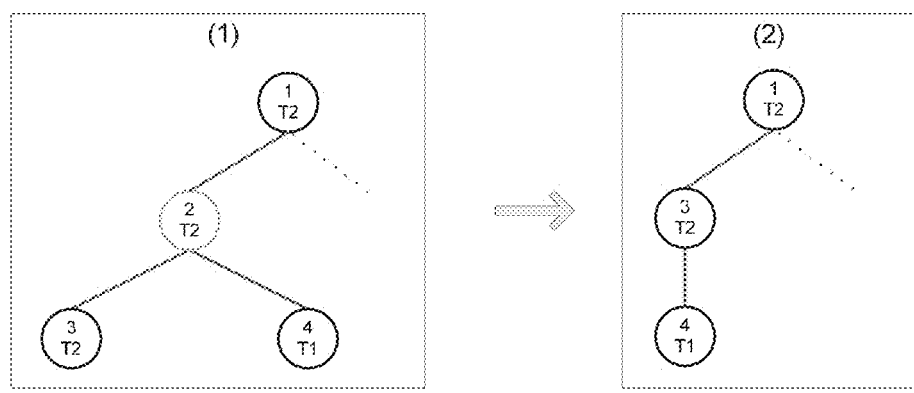
FIG. 13 is an illustration of the general method used to reconfigure the network in the case of the unexpected (non-graceful) departure of a Type 2 node with one Type 2 child and one Type 1 Child, where the Type 2 Child is the preferred (green) child.

FIG. 13 illustrates the case where the green child of the unexpectedly departing node is Type 2 and the red child is Type 1.
1. Node 2 non-gracefully departs. Nodes 3 and 4 detect that their parent has departed.
2. Nodes 3 and 4 climb their path to their grandparent (Node 1). Node 1 places Nodes 3 and 4 based on its recommended parent list. They will end up in different places depending on who gets to Node 1 first. Image (2) shows one possible scenario.

Figure 14:
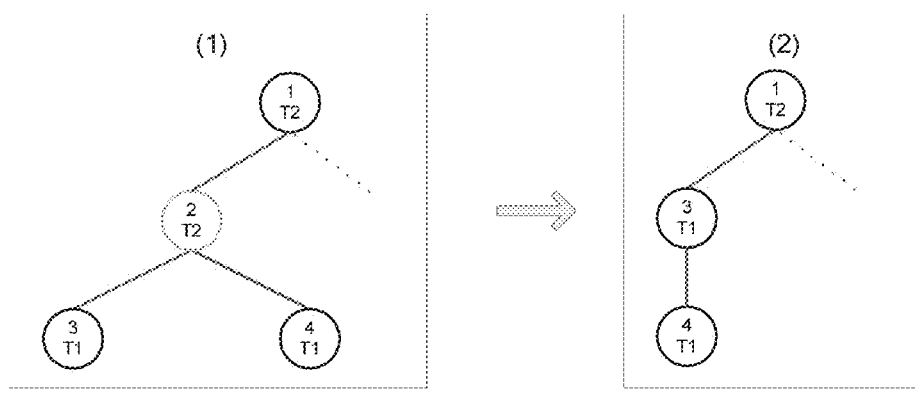
FIG. 14 is an illustration of the general method used to reconfigure the network in the case of the unexpected (non-graceful) departure of a Type 2 node with two Type 1 children.

FIG. 14 illustrates the case where both children of the departing node are Type 1.
1. Node 2 non-gracefully departs. Nodes 3 and 4 detect that their parent has departed.
2. Nodes 3 and 4 climb their path to their grandparent (Node 1). Node 1 places Nodes 3 and 4 based on its recommended parent list. They will end up in different places depending on who gets to Node 1 first. Image (2) shows one possible scenario.

Figure 15:
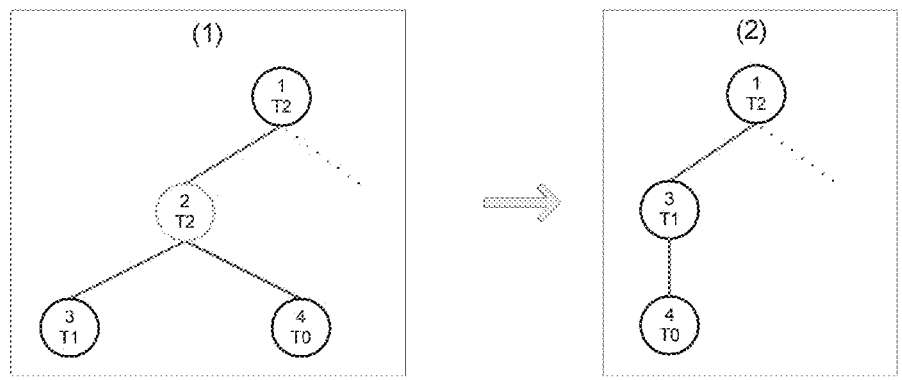
FIG. 15 is an illustration of the general method used to reconfigure the network in the case of the unexpected (non-graceful) departure of a Type 2 node with one Type 1 child and one Type 0 Child, where the Type 1 Child is the preferred (green) child.

FIG. 15 illustrates the case where the green child is Type 1 and the red child is Type 0.
1. Node 2 non-gracefully departs. Nodes 3 and 4 detect that their parent has departed.
2. Nodes 3 and 4 climb their path to their grandparent (Node 1). Node 1 places Nodes 3 and 4 based on its recommended parent list. They will end up in different places depending on who gets to Node 1 first. Image (2) shows one possible scenario.

Figure 16:
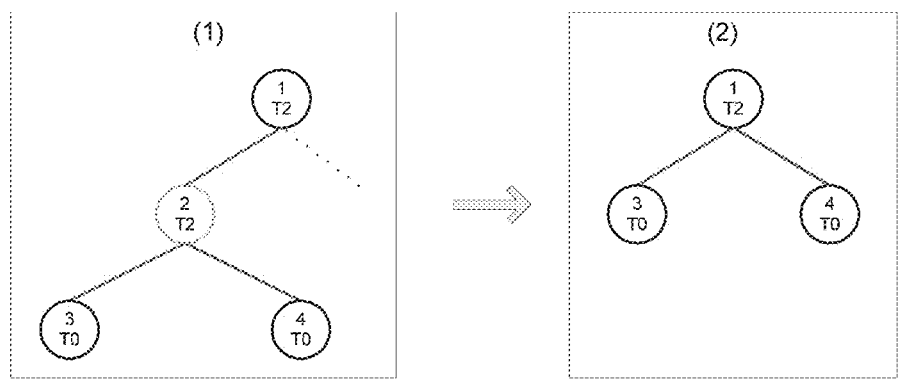
FIG. 16 is an illustration of the general method used to reconfigure the network in the case of the unexpected (non-graceful) departure of a Type 2 node with two Type 0 children.

FIG. 16 illustrates the case where both child nodes of the departing node are Type 0.
1. Node 2 non-gracefully departs. Nodes 3 and 4 detect that their parent has departed.
2. Nodes 3 and 4 climb their path to their grandparent (Node 1). Node 1 places Nodes 3 and 4 based on its recommended parent list. They will end up in different places depending on who gets to Node 1 first. Image (2) shows one possible scenario.

Figure 17:
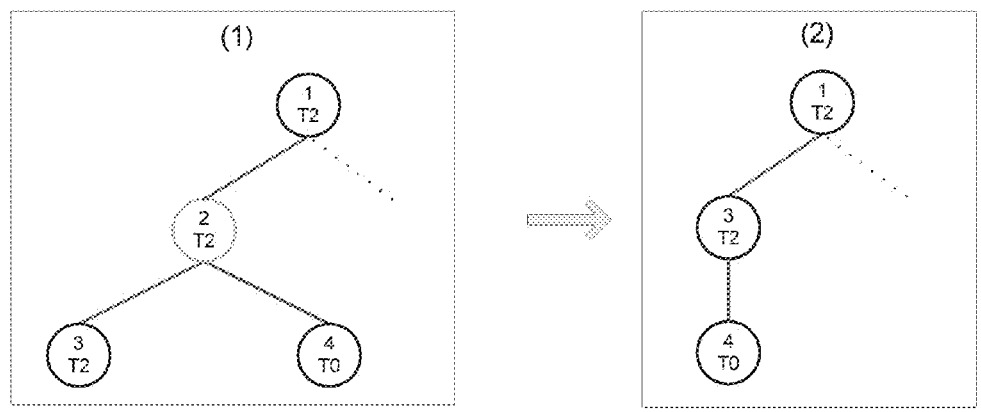
FIG. 17 is an illustration of the general method used to reconfigure the network in the case of the unexpected (non-graceful) departure of a Type 2 node with one Type 2 child and one Type 0 Child, where the Type 2 Child is the preferred (green) child.

FIG. 17 illustrates the case where the green child is Type 2 and the red child is Type 0.
1. Node 2 non-gracefully departs. Nodes 3 and 4 detect that their parent has departed.
2. Nodes 3 and 4 climb their path to their grandparent (Node 1). Node 1 places Nodes 3 and 4 based on its recommended parent list. They will end up in different places depending on who gets to Node 1 first. Image (2) shows one possible scenario.

Figure 18:
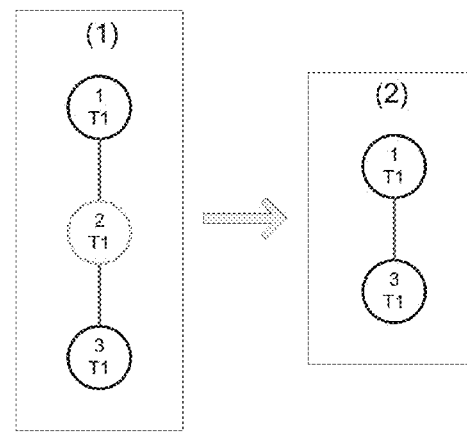
FIG. 18 is an illustration of the general method used to reconfigure the network in the case of the unexpected (non-graceful) departure of a Type 1 node where that Type 1 node has a child.

FIG. 18 illustrates a unexpected (non-graceful) depart of a Type 1 node. Node 2, a Type 1 node, departs unexpectedly from the network in a non-graceful manner. Node 3 becomes aware of the departure of Node 2 via the connection between the two nodes timing out or by some other means. Node 3 climbs its path to its former grandparent Node 1 and Node 1 accepts Node 3 as its child.
1. Node 2 is shutdown non-gracefully. Node 3 times out on its connection to Node 2. Node 3 climbs its path to his grandparent, Node 1.
2. Node 1 accepts Node 3 as its child.

Handling Message Loss in Graceful Departs

When a client is shutdown gracefully, it sends out the depart messages to each of its kids and its parent. However, there is no guarantee that these messages will be received by their intended recipients. FIG. 19 through FIG. 25 illustrate the consequences of the failure of various messages to reach their intended recipients.

Figure 19:
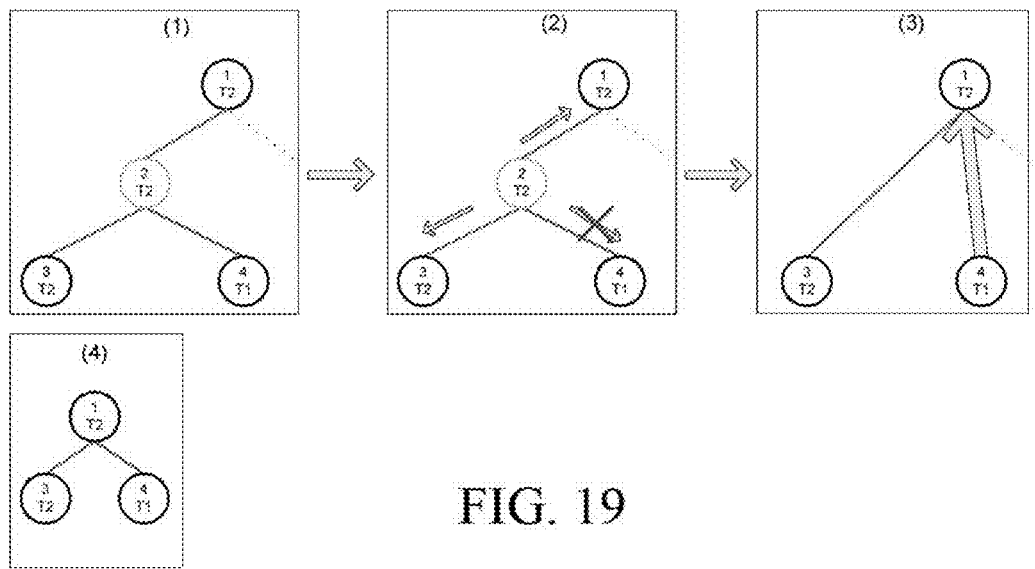
FIG. 19 is an illustration of the general method used to reconfigure the network in the case of a departure of a Type 2 node with two children where the depart message is not received by the non-preferred (red) child.

FIG. 19 illustrates the case in which the depart message fails to reach the non-preferred (red) child.
1. Node 2 is shutdown gracefully.
2. Node 2 sends out the depart packets but Node 4 fails to receive it.
3. Node 3 connects to Node 1 correctly. Node 4 waits until its connection to Node 2 times out and then climbs its path to Node 1.
4. Node 1 places Node 4 in its subtree if it can. If it cannot place Node 4, it rejects Node 4. Image (4) shows one possible outcome.

Figure 20:
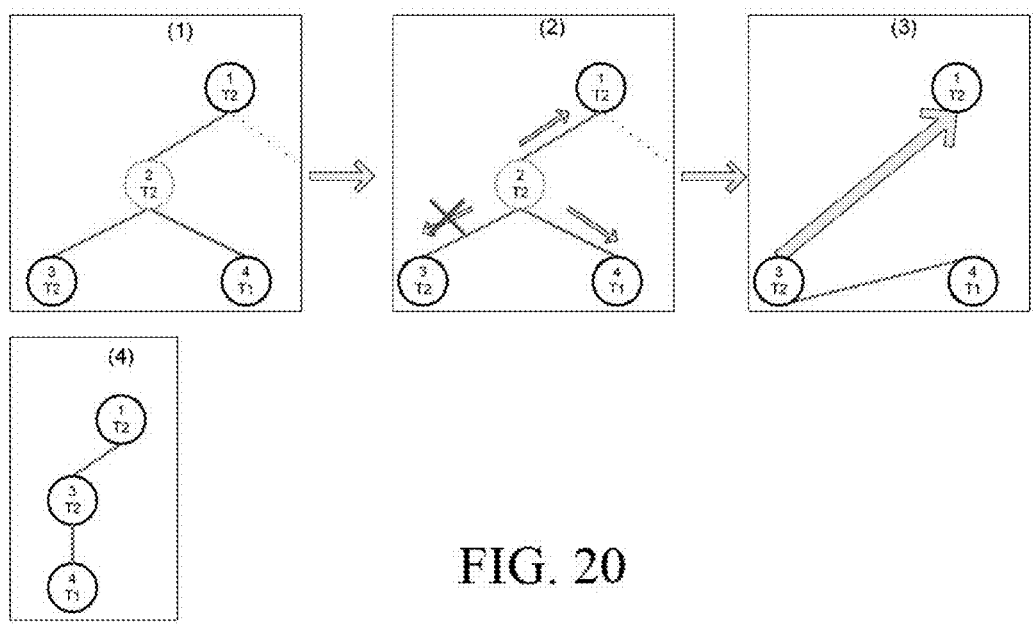
FIG. 20 is an illustration of the general method used to reconfigure the network in the case of a departure of a Type 2 node with two children where the depart message is not received by the preferred (green) child.

FIG. 20 illustrates the case in which the depart message fails to reach the preferred (green) child.
1. Node 2 is shutdown gracefully.
2. Node 2 sends out the depart packets but Node 3 fails to receive it.
3. Node 4 connects to the first node in the path it was given in the depart packet from Node 2, which is Node 3. Node 3's connection to Node 2 times out and it climbs its path to Node 1.
4. Node 1 places Node 3 in its subtree if it can. If it cannot place Node 3, it rejects Node 3 and Node 3 climbs its path, dragging Node 4 with it. Node 1 should be able to accept Node 3 as it should have an open slot. Image (4) shows one possible outcome.

Figure 21:
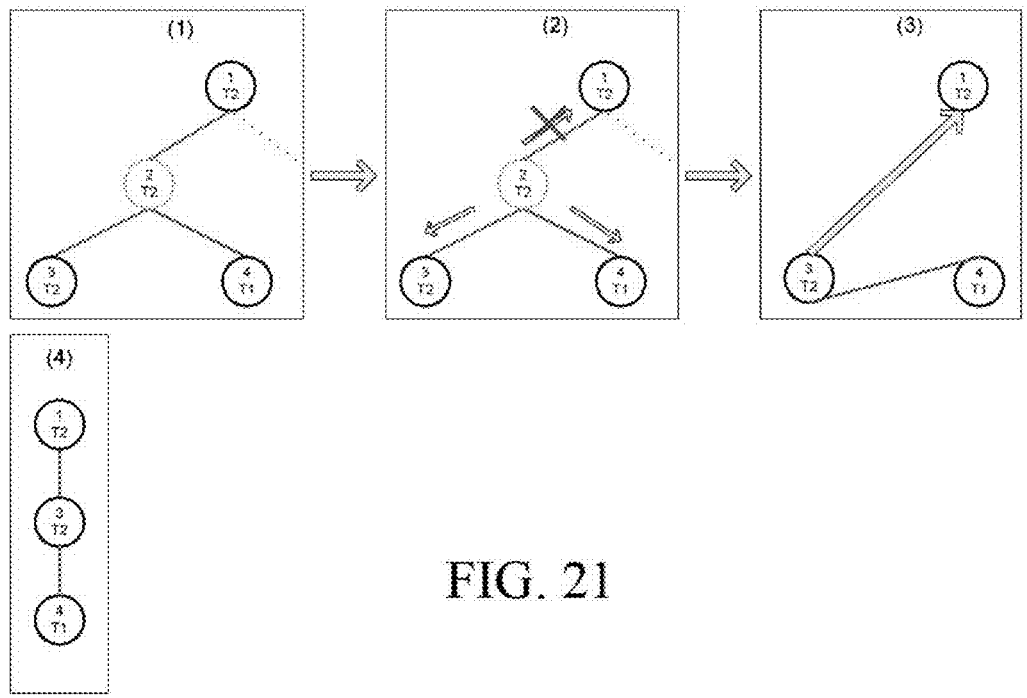
FIG. 21 is an illustration of the general method used to reconfigure the network in the case of a departure of a Type 2 node with two children where the depart message is not received by the parent of the departing node.

FIG. 21 illustrates the case in which the depart message fails to reach the parent.
1. Node 2 is shutdown gracefully.
2. Node 2 sends out the depart packets, but Node 1 fails to receive it.
3. Node 4 connects to the first node in the path in the depart packet it was given by Node 2, i.e. Node 3. Node 3 connects to Node 1. Node 1 clears Node 3 from its NTM. If Node 1's connection to Node 2 has timed out, it will place Node 3 in its subtree correctly. If Node 1's connection to Node 2 has been timed out, it will place Node 3 based on its subtree which contains a node that has already left the network. In this case, it will send Node 3 to Node 2. This connection will fail. Node 3 will then climb to Node 1's parent for placement.

4. Image (4) shows one possible outcome.

Figure 22:
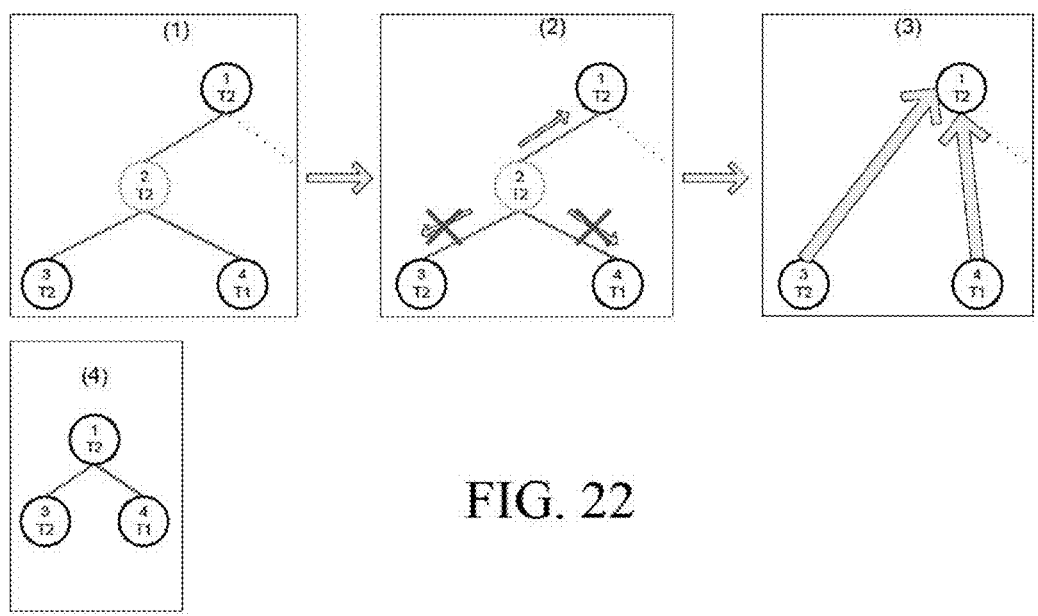
FIG. 22 is an illustration of the general method used to reconfigure the network in the case of a departure of a Type 2 node with two children where depart messages are not received by either of the two children.

FIG. 22 illustrates the case in which the depart messages fail to reach both children.

1. Node 2 is shutdown gracefully.
2. Node 2 sends out the depart packets but Nodes 3 and 4 fail to receive it.
3. Nodes 3 and 4 timeout on their connections to Node 2 and climb to their grandparent, Node 1, for placement. Node 1 has been told by Node 2's depart packet that it should expect Node 3 to connect to it. Thus, Node 1 will wait for a certain window for Node 3 to connect. If this window has not expired, regardless of which node arrives first, Node 3 will be accepted and Node 4 will be placed normally because Node 1 has reconfigured its internal Network Technology Model based on the assumed acceptance of Node 3. Note that if this window expires, all registers are treated normally.
4. Image (4) shows one possible outcome.

Figure 23:
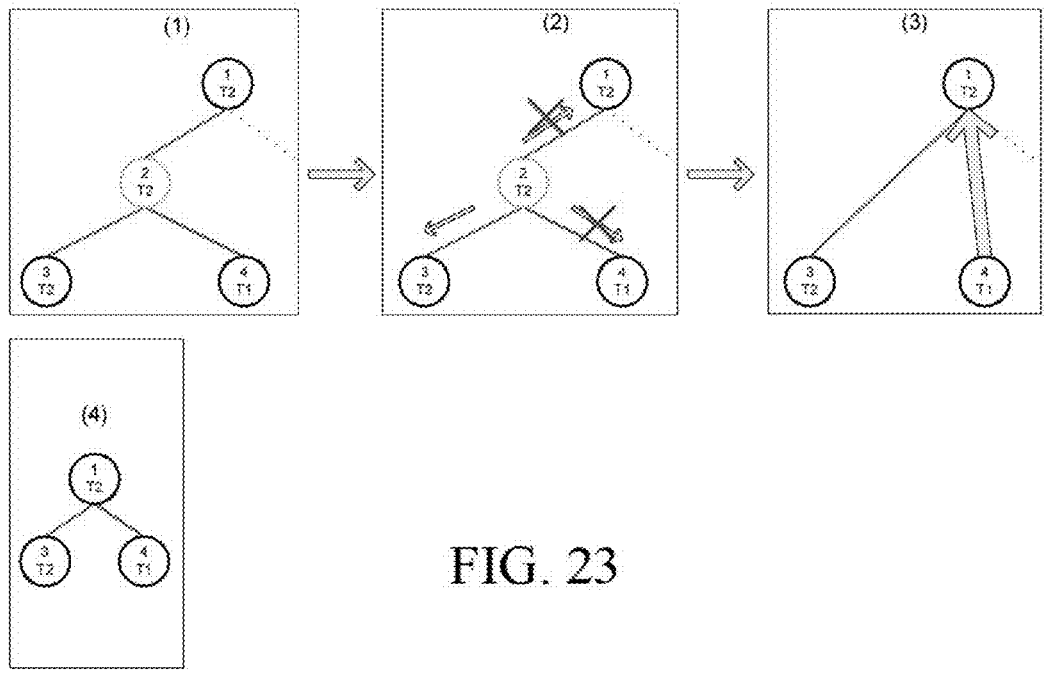
FIG. 23 is an illustration of the general method used to reconfigure the network in the case of a departure of a Type 2 node with two children where depart messages are not received by either the parent of the departing node nor the departing node's non-preferred (red) child.

FIG. 23 illustrates the case in which the depart message fails to reach both the parent and the non-preferred (red) child.

1. Node 2 is shutdown gracefully.
2. Node 2 sends out the depart packets but Nodes 1 and 4 fail to receive it.
3. Node 3 connects to Node 1. Node 4 is not expecting Node 3. When Node 1 gets the register from Node 3 it will remove Node 3 and its subtree from its NTM. It will place Node 3. If Node 1 has timed out on its connection to Node 2, Node 2 will not be in Node 1's NTM nor its rp list. Thus, Node 3 will be placed correctly. If Node 1 has not timed out on its connection to Node 2, then Node 3 may be sent to Node 2. This connection would fail and Node 3 would climb to Node 1's parent for placement. Node 4 would timeout on its connection to Node 2 and would climb to its grandparent, Node 1, for placement. Node 1 is not expecting Node 4. Node 1 removes Node 4 and its subtree from its NTM and places Node 4 based on its updated NTM.
4. Image (4) shows one possible outcome.

Figure 24:
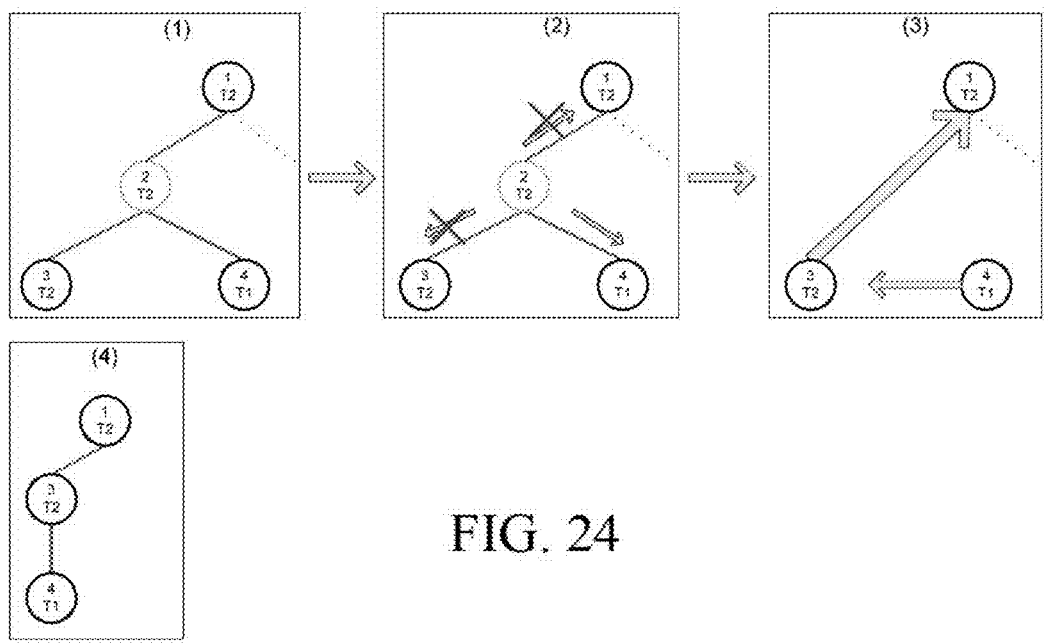
FIG. 24 is an illustration of the general method used to reconfigure the network in the case of a departure of a Type 2 node with two children where depart messages are not received by either the parent of the departing node nor the departing node's preferred (green) child.

FIG. 24 illustrates the case in which the depart message fails to reach both the parent and the preferred (green) child.

1. Node 2 is shutdown gracefully.
2. Node 2 sends out the depart packets but Nodes 1 and 3 fail to receive it.
3. Node 4 connects to the first node in the path given by Node 2 in the depart packet which, in this case, is Node 3. Node 3 will receive the register from Node 4 and place it normally. Node 3 will time out on its connection to Node 2 and climb its path to its grandparent, Node 1, for placement. Node 1 will not be expecting Node 3. Node 1 will remove Node 3 and its subtree from its NTM. It will then place Node 3.
4. Image (4) shows one possible outcome.

Figure 25:
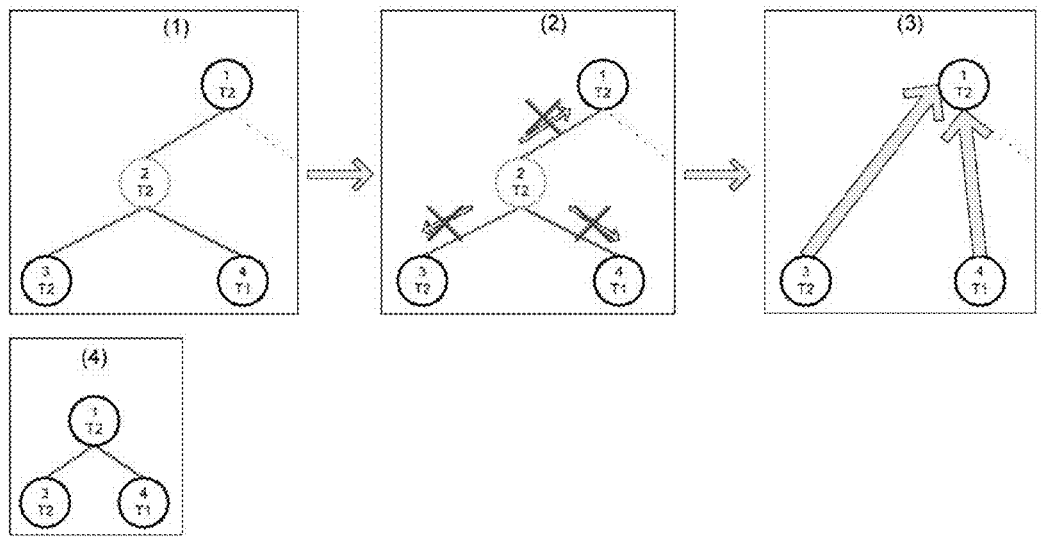
FIG. 25 is an illustration of the general method used to reconfigure the network in the case of a departure of a Type 2 node with two children where depart messages are not received by either the parent of the departing node nor the departing node's two children.

FIG. 25 illustrates the case in which all three messages fail to reach their intended recipients. In this case the graceful depart reverts to the standard non-graceful depart described above.

1. Node 2 is shutdown gracefully.
2. Node 2 sends out the depart packets but Nodes 1, 3 and 4 fail to receive it.
3. If all three nodes fail to receive the depart packet, the depart becomes non-graceful and acts accordingly.
4. Image (4) shows one possible outcome.

Determining Placement During Reconfiguration & Maintaining Accurate Network Topology Models When Node A sends a message to Node B requesting that Node A be placed in the broadcast tree, it is necessary that Node B have access to an internal Network Topology Model (NTM) that reflects the overall state of the network with enough fidelity to assign Node A to a parent node consistent with maintaining the key properties of the network, such as maintaining approximate tree balance and placing stronger nodes as high in the tree (as close to the server) as practical.

This NTM must be maintained even during times of high turnover when nodes are frequently joining and departing the network. To that end, the parent of a departing node must be able to effectively predict the likely effect on the overall topology of the network its departing child will have. In other words, the parent node must update its internal NTM to account for connections that will likely be broken and new connections that will likely be formed as a result of the departure of its child from the network. These effects are not necessarily localized and may propagate throughout the sub-tree rooted at the parent all the way to the edge of the network.

In the system and method of U.S. Pat. No. 7,035,933 reconfigurations to a node's local copy of the NTM for the parent of a departing node involved recursively following the green path of the parent's sub-tree and having red children connect to their green siblings. This elegant approach emerged from the system requirement that all nodes could either repeat to two children or not at all—and that, aside from greenness/redness, all repeaters were essentially equal. Thus, a red child (Node C) was assumed able to connect to its green sibling (Node B), and the green child (Node B) was assumed able to accept its red sibling (Node C) as a child, provided the green child (Node B) did not already have two children of its own (Node D and Node E) or if it (Node B) did it (Node B) would be required to bump its existing red child (either Node D or Node E) making room for its (Node B's) incoming red sibling (Node C). In cases where the red sibling was not capable of repeating to two children and the red child of the green sibling was also a not capable of repeating to two children, reconfigurations were allowed to continue as described above with the understanding that the green sibling in reality would simply reject the connection request from the red sibling as a non-repeat capable node was not allowed to bump another non repeat capable node. The difference between the outcomes of the NTM reconfiguration and the reality of the network-level request logic was allowed to persist, because the difference did not affect the structure of the NTM as far as placement of new nodes was concerned.

With the complexity of the new placement logic for the present system and method, reconfiguration must solve issues that didn't exist before. In the present system and method, all repeat capable nodes are not essentially equal as they were in U.S. Pat. No. 7,035,933. Some repeat capable nodes can support two children (Type 2 nodes) while other repeat capable nodes can support only one child (Type 1 nodes). Of the repeat capable nodes that can only support one child, there is the additional consideration of its priority. A Type 1 node of normal priority (e.g., a T1N) cannot be the parent of a Type 1 of a higher priority (e.g., a T1H), and no Type 1 node, regardless of its priority, may become the parent of a Type 2 node.

Figure 26:
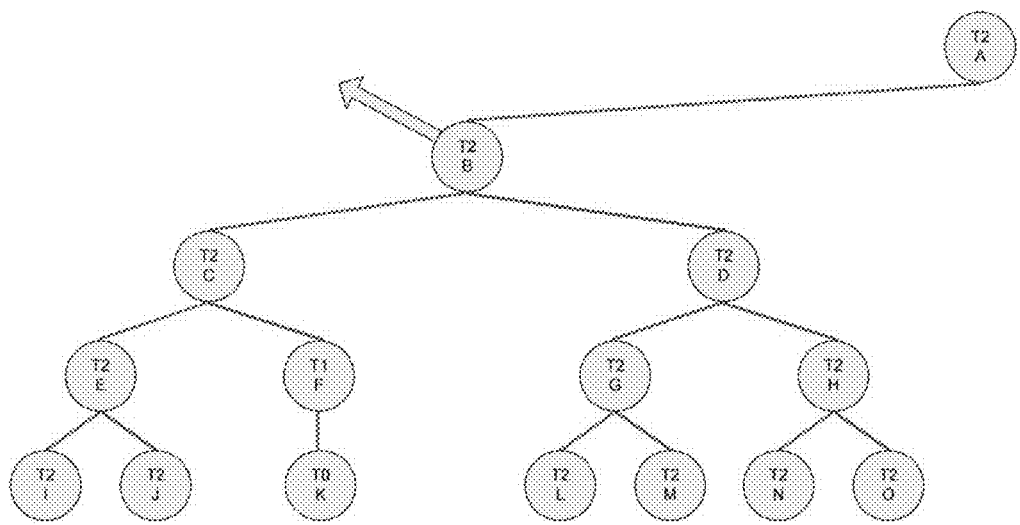
FIG. 26 is an illustration of a network in which Node B is departing gracefully.

Consider the situation illustrated in FIG. 26. Node B is departing the network in a graceful manner. The parent of Node B, Node A, needs to update its internal Network Topology Model to account for the reconfigurations that are likely to occur as a result of Node B's departure.

In one embodiment, the method of U.S. Pat. No. 7,035, 933 would be: (1) the green child of the departing node connects to its former grandparent, in this particular case Node C connects to Node A, (2) the red child of the departing node cross connects to its green sibling, in this particular case Node D cross connects to Node C, (3) the green child bumps its own red child to make room for its incoming red sibling, in this particular case Node C bumps Node F to accept Node D, (4) the bumped red grandchild of the departing node cross connects to its own green sibling, in this particular case Node F would cross connect to Node E, (5) the green-green grandchild of the departing node would bump its own red child to make room for its incoming red sibling, in this particular case Node E bumps Node J to accept Node F, and finally (6) the bumped red great grandchild of the departing node cross connects to its own green sibling, in this case Node J cross connects to Node I.

The problem with the method of U.S. Pat. No. 7,035,933 is that it does not account for the fact that Node F cannot connect to Node E since Node F is a Type 1 node and both of Node E's children are Type 2. In the system of the present system and method Type 1 nodes cannot bump Type 2 nodes.

Thus the present system and method includes the following method that allows higher level nodes (such as Node A) to predict the reconfiguration behavior of lower level nodes (such as Node E) in order for the higher level node to update its internal Network Topology Model to reflect the most likely result of a reconfiguration caused by the departure of its child (Node B).

The method consists of having each node periodically propagate up to its parent a description of that node's state (including that node's recommended parent list) together with the state of all nodes located beneath that node and the structure of their relationship to the node in question. Thus for example referring to FIG. 26, Node's I and J would propagate their information up to Node E; Node K its information to Node F; Nodes L and M up to Node G; Nodes N and O up to Node H. Node E would propagate its information and its children's information (including the fact that Node I is the green child of Node E and Node J is the Red Child of E) to Node C. Likewise Node F would propagate its information and its child's information to Node C; Nodes G and H their information and their children's information to Node D. Nodes C and D would propagate their information and the information of all of their descendants to Node B, and likewise Node B its information and its descendants information to Node A.

In this manner, Node A will have received information from all of the nodes in its entire sub-tree with which to populate its internal network topology model. Thus, when Node B departs the network, Node A will be able to determine the likely result of this departure by consulting the recommended parent lists of the various nodes in its sub-tree.

It should be noted at this point, that a particular node's internal model of the network may not be completely accurate as configuration changes may have taken place at lower levels and those changes may not have yet propagated up to the node in question. Regardless of this limitation, the information provided is judged "good enough" for making placement decisions and predictions as to network state following child departure.

Figure 27:
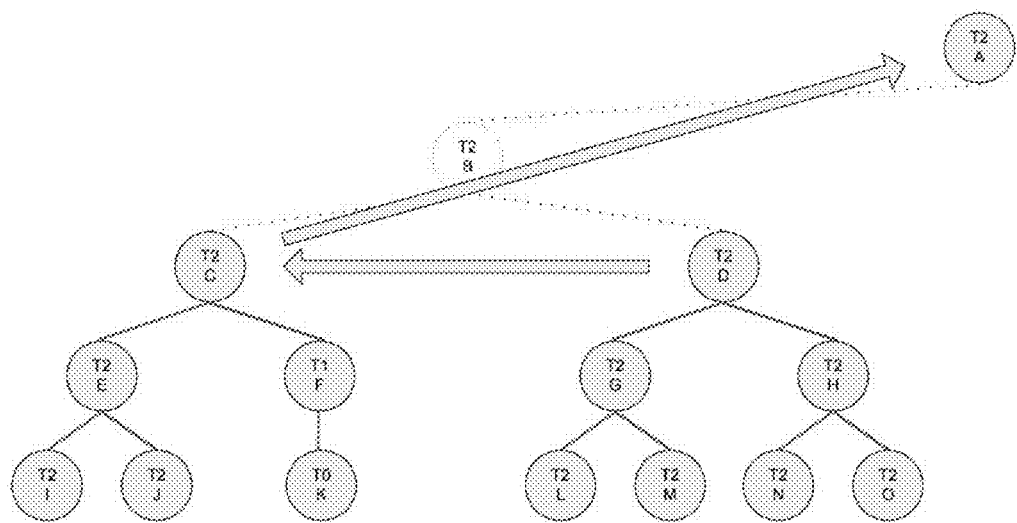
FIG. 27 is an illustration of the first two steps in the reconfiguration of the network illustrated in FIG. 26 following the departure of Node B.

Continuing with the example begun in FIG. 26, FIG. 27 illustrates the first two steps of the reconfiguration begun by the graceful departure of Node B. Node C connects to Node A, corresponding to the green child connecting to the parent of the departing node; and Node D connects to Node C, corresponding to the red child of the departing node cross connecting to its green sibling. In point of fact, as illustrated in FIG. 4, Node B instructs Node C to connect to Node A, and Node D to connect to Node C.

Figure 28:
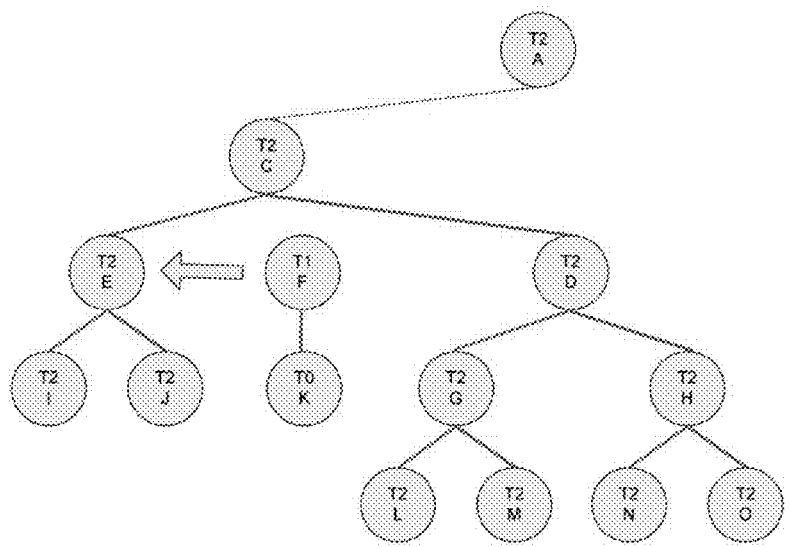
FIG. 28 is an illustration of the state of the network following the connection of Node C to Node A and Node D to Node C.

FIG. 28 illustrates the state of the network immediately following the connection of Node C to Node A and Node D to Node C. Note that Node F, the green-red grandchild of the departing node, has been bumped by Node C in order to make room for Node D to connect.

Node F wishes to connect to Node E, but unfortunately since Node F is Type 1 and both of Node E's children are Type 2, Node F cannot connect directly to Node E. This issue can be resolved in the following way. When Node F is bumped by Node C, Node C can consult its Network Topology Model and determine that Node E's recommend parent for incoming nodes will be Node I (as Node I is the green child of Node E) and pass this recommended parent directly to Node F as part of the depart/bump message Node C sends to Node F.

Node A, when updating its own internal Network Topology Model, can predict that Node C will instruct Node F to connect to Node I, as Node A can determine the recommended parents associated with every node in its sub-tree. This allows Node A to update its internal model in accordance with what is likely to happen in the actual network during the reconfiguration events.

Figure 29:
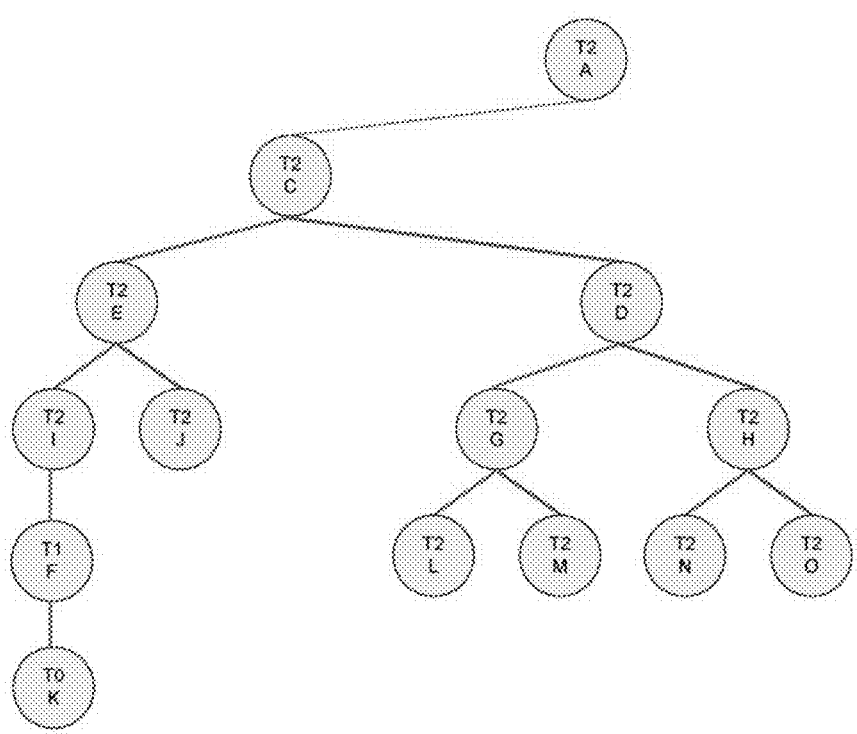
FIG. 29 is an illustration of the final state of the network of FIG. 26 following the departure of Node B.

FIG. 29 illustrates the final state of the network of FIG. 26 following the departure of Node B. Assuming all reconfiguration events resulting from the departure of Node B proceed as planned and there are no other node additions, deletions, or reconfigurations that take place during this time period FIG. 29 should be an accurate reflection of both the physical network and Node A's internal Network Topology Model.

A Complete Example of Network Reconfiguration Following Graceful Depart

FIG. 30, parts (a)-(f), provide a complete example of network reconfiguration following the graceful departure of a node.

FIG. 30 (*a*) shows the complete network (full tree) prior to the departure of a node. FIG. 30 (*b*) illustrates the graceful departure of Node 2 from the network. Node 4 is instructed by the departing node to connect to Node 1 and the result can be seen in FIG. 30 (*c*). Node 5 is instructed by the departing node to connect to Node 4. The particular type of join Node 5 is instructed to perform with Node 4 is a "priority join" meaning that Node 4 must accept Node 5 (and therefore Node 4 must bump its red child to make room for Node 4). FIG. 30 (*d*) illustrates the state of the network after Node 5 is accepted by Node 4. Note that Node 9, the former red child of Node 4, has been bumped. When Node 4 bumped Node 9 it provided Node 9 with a connection path. That connection path included the recommended parent that Node 9 should attempt to connect to. In this case Node 9 is told by Node 4 to connect to Node 25. The reason Node 4 chose Node 25 for Node 9 is that Node 25 is the highest node (closest node to the server) that Node 4 is aware of that can accept a node of Node 9's type. Note that being of Type 1N, all that can be bumped by Node 9 are Type 0 nodes—resulting in the candidate parents for Node 9 being Node 35, Node 28, Node 29, and Node 25, of which Node 25 is the closest to the server. FIG. 30 (*e*) illustrates the state of the network after Node 9 connects to Node 25. Note that in order for Node 25 to accept Node 9 as a child, it was necessary for node 25 to bump Node 34, a Type 0 Normal Priority node. As part of the bump message, Node 25 instructs Node 34 to attempt to connect to Node 9 (either for a direct connection or for instructions as to where it can connect). Node 34 attempts to connect to Node 9, the root of a Type 1 chain that terminates in a Type 0 Low Priority node (Node 26). Since Node 34's Type 0 Normal Priority out ranks Node 26's Type 0 Low Priority, Node 9 instructs Node 34 to connect to Node 26's parent, Node 17. Since Node 26 cannot connect to Node 34 or Node 17, Node 26 must climb it parent path, beginning with the first Type 2 node in the path, Node 4, and, if necessary, working back up the parent path towards the server. In this case, however, Node 4 is able to recommend connection to Node 29 and the reconfiguration cascade concludes. FIG. 30 (f) illustrates the final configuration of the network.

A Complete Example of Network Reconfiguration Following Unexpected (Non-Graceful) Depart FIG. 31, parts (a)-(d), provide a complete example of network reconfiguration following the unexpected (non-graceful) departure of a node.

FIG. 31 (a) illustrates a complete network prior to an unexpected departure of Node 6, a Type 2 Normal Priority node. After the departure of Node 6, its children, Nodes 12 and 13, note its absence. Both Node 12 and Node 13 connect to their grandparent, Node 3. At this point a "race condition" exists between Node 12 and Node 13. Whichever node first connects to Node 3 will be allowed to join as its child. In this case we assume that Node 12 arrives first and is added as a child of Node 3. FIG. 31 (b) illustrates the state of affairs at this point. Node 13 then attempts to connect to Node 3. Since Node 13 is a Type 1 High Priority node, Node 3 has three potential slots at which it could place Node 13. These are: (1) as a child of Node 12, (2) as a child of Node 23, or (3) as a child of Node 15. Since Node 12 is the closest potential parent to the root of the tree, Node 3 tells Node 13 to connect to Node 12. Node 13 then connects to Node 12 causing it to bump Node 21, a Type 1 Normal Priority Node. As Node 12 bumps Node 21, it tells the node to connect to Node 13 for a connection path. The situation at this point is illustrated in FIG. 31 (c). Node 13 tells Node 21 to connect to Node 22. Node 21 does so, causing Node 22 to bump its Type 0 Normal Priority child, Node 31. Node 31 attempts to connect to Node 21 but is rejected and must climb its path. Eventually, Node 31 finds a home as a child of Node 32.

While the invention has been particularly shown and described with reference to a preferred embodiment thereof, it will be understood by those skilled in the art that various changes in form and details may be made therein without departing from the spirit and scope of the invention.

What is claimed is:

1. A distributed broadcast network, comprising:
a plurality of nodes organized into a binary tree structure where the connections between nodes represent communication paths over a communications network for receiving data, said network further organized to include three types of nodes, T0, T1, and T2;
the T0 nodes having a single parent node that feeds the T0 node with one or more data streams;
the T1 nodes having a single parent node that feeds the T1 node with one or more data streams, the T1 node being configured to have no more than one child node that receives data from the T1 node; and,
the T2 nodes having a single parent node that feeds the T2 node with one or more data streams, the T2 node being configured to have no more than two children nodes that receive data from the T2 node.

2. The system of claim 1, configured so that no T2 node can receive data from a node designated as T1.

3. The system of claim 1, wherein said nodes comprise one or more computers, set top box devices, game consoles, routers, or other physical devices, or some combination of these devices.

4. The system of claim 1, wherein said communications network comprises the Internet, a local area network, a wide area network, or a combination of such networks.

5. The system of claim 1, wherein the T0 node has no child nodes that receive data from the T0 node.

6. The system of claim 1, wherein the T0 node is capable of bumping existing nodes at lower priorities, with the exception of T0 low priority nodes, which are incapable of bumping nodes of any type.

7. The system of claim 1, wherein the T1 node is capable of bumping any existing T1 nodes at lower priorities and all existing T0 nodes at any priorities.

8. The system of claim 1, wherein the T2 node is capable of bumping existing T2 nodes at lower priorities and all existing T1 and T0 nodes at any priorities.

* * * * *